United States Patent
Cope et al.

(10) Patent No.: US 8,862,181 B1
(45) Date of Patent: Oct. 14, 2014

(54) ELECTRONIC PURCHASE TRANSACTION TRUST INFRASTRUCTURE

(75) Inventors: Warren B. Cope, Olathe, KS (US); Lyle W. Paczkowski, Mission Hills, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 188 days.

(21) Appl. No.: 13/482,731

(22) Filed: May 29, 2012

(51) Int. Cl.
*H04M 1/00* (2006.01)

(52) U.S. Cl.
USPC .......... 455/556.1; 455/41.1; 455/411; 455/39; 455/410; 455/456.1; 455/550.1; 455/403; 455/41.2

(58) Field of Classification Search
CPC ..... H04W 64/00; H04W 4/02; H04W 64/003; H04W 4/023; H04W 4/021; H04W 4/028; G01S 5/0252; G01S 5/10; H04M 1/72572
USPC ............ 455/41.1, 411, 410, 456.1, 39, 550.1, 455/403, 450
See application file for complete search history.

(56) References Cited

U.S. PATENT DOCUMENTS

| | | | |
|---|---|---|---|
| 5,303,378 A | 4/1994 | Cohen | |
| 6,219,712 B1 | 4/2001 | Mann et al. | |
| 6,314,409 B2 | 11/2001 | Schneck et al. | |
| 6,490,601 B1 | 12/2002 | Markus et al. | |
| 6,668,322 B1 | 12/2003 | Wood et al. | |
| 6,732,919 B2 | 5/2004 | Macklin et al. | |
| 6,823,454 B1 | 11/2004 | Hind et al. | |
| 6,824,064 B2 | 11/2004 | Guthery et al. | |
| 6,886,741 B1 | 5/2005 | Salveson | |
| 6,895,234 B1 | 5/2005 | Laursen et al. | |
| 7,043,230 B1 | 5/2006 | Geddes et al. | |
| 7,142,840 B1 | 11/2006 | Geddes et al. | |
| 7,413,113 B1 | 8/2008 | Zhu | |
| 7,494,058 B2 | 2/2009 | Bonalle et al. | |
| 7,546,266 B2 | 6/2009 | Beirne et al. | |
| 7,575,177 B2 | 8/2009 | Killian et al. | |
| 7,644,859 B1 | 1/2010 | Zhu | |
| 7,650,645 B1 | 1/2010 | Langendorf et al. | |
| 7,853,782 B1 | 12/2010 | Geddes | |
| 7,873,837 B1 | 1/2011 | Lee et al. | |
| 7,895,642 B1 | 2/2011 | Larson et al. | |
| 7,926,714 B1 | 4/2011 | Zhu | |
| 7,988,060 B2 | 8/2011 | Killian et al. | |

(Continued)

FOREIGN PATENT DOCUMENTS

| WO | 2013170228 A2 | 11/2013 |
|---|---|---|
| WO | 2014004590 A2 | 1/2014 |
| WO | 2014018575 A2 | 1/2014 |
| WO | 2014025687 A2 | 2/2014 |

OTHER PUBLICATIONS

Advisory Action dated Dec. 19, 2012, U.S. Appl. No. 13/250,611, filed Sep. 30, 2011.

(Continued)

*Primary Examiner* — Joseph Arevalo

(57) ABSTRACT

A mobile phone comprising a processor, a non-transitory memory, and an application stored in the non-transitory memory. When executed by the processor, the application receives an indicia of a product provided by a peripheral device of the mobile phone, identifies a product based on the indicia, analyzes options for paying electronically for the product, and presents a proposal for paying electronically for the product.

20 Claims, 9 Drawing Sheets

(56) References Cited

U.S. PATENT DOCUMENTS

| | | |
|---|---|---|
| 7,996,324 B2 | 8/2011 | Bishop et al. |
| 8,123,128 B1 | 2/2012 | Zhu |
| 8,238,823 B2 | 8/2012 | Maugars et al. |
| 8,401,904 B1 | 3/2013 | Simakov et al. |
| 8,402,543 B1 | 3/2013 | Ranjan et al. |
| 8,429,409 B1 | 4/2013 | Wall et al. |
| 8,443,420 B2 | 5/2013 | Brown et al. |
| 8,494,576 B1 | 7/2013 | Bye et al. |
| 8,504,097 B1 | 8/2013 | Cope et al. |
| 8,566,168 B1 | 10/2013 | Bierbaum et al. |
| 8,577,731 B1 | 11/2013 | Cope et al. |
| 8,632,000 B2 | 1/2014 | Laracey |
| 8,649,770 B1 | 2/2014 | Cope et al. |
| 8,667,607 B2 | 3/2014 | Paczkowski et al. |
| 8,712,407 B1 | 4/2014 | Cope et al. |
| 8,726,343 B1 | 5/2014 | Borzycki et al. |
| 8,738,333 B1 | 5/2014 | Behera et al. |
| 8,750,839 B1 | 6/2014 | Paczkowski et al. |
| 8,752,140 B1 | 6/2014 | Paczkowski et al. |
| 8,762,298 B1 | 6/2014 | Ranjan et al. |
| 2002/0095389 A1 | 7/2002 | Gaines |
| 2002/0156911 A1 | 10/2002 | Croman et al. |
| 2002/0174344 A1 | 11/2002 | Ting |
| 2002/0184325 A1 | 12/2002 | Killcommons et al. |
| 2002/0194361 A1 | 12/2002 | Itoh et al. |
| 2002/0194496 A1 | 12/2002 | Griffin et al. |
| 2003/0126094 A1 | 7/2003 | Fisher et al. |
| 2003/0126225 A1 | 7/2003 | Camble et al. |
| 2003/0237002 A1 | 12/2003 | Oishi et al. |
| 2004/0010462 A1 | 1/2004 | Moon et al. |
| 2004/0218741 A1 | 11/2004 | Welton |
| 2004/0233844 A1 | 11/2004 | Yu et al. |
| 2004/0243810 A1 | 12/2004 | Rindborg et al. |
| 2004/0260647 A1 | 12/2004 | Blinn et al. |
| 2005/0015601 A1 | 1/2005 | Tabi |
| 2005/0138433 A1 | 6/2005 | Linetsky |
| 2005/0235166 A1 | 10/2005 | England et al. |
| 2006/0036851 A1 | 2/2006 | DeTreville |
| 2006/0156026 A1 | 7/2006 | Utin |
| 2006/0190605 A1 | 8/2006 | Franz et al. |
| 2006/0212853 A1 | 9/2006 | Sutardja |
| 2006/0224901 A1 | 10/2006 | Lowe |
| 2006/0237528 A1 | 10/2006 | Bishop et al. |
| 2006/0261949 A1 | 11/2006 | Kim et al. |
| 2006/0277307 A1 | 12/2006 | Bernardin et al. |
| 2006/0277433 A1 | 12/2006 | Largman et al. |
| 2007/0011061 A1 | 1/2007 | East |
| 2007/0038648 A1 | 2/2007 | Chetwood et al. |
| 2007/0055785 A1 | 3/2007 | Stevens |
| 2007/0061535 A1 | 3/2007 | Xu et al. |
| 2007/0079120 A1 | 4/2007 | Bade et al. |
| 2007/0094273 A1 | 4/2007 | Fritsch et al. |
| 2007/0094691 A1 | 4/2007 | Gazdzinski |
| 2007/0177771 A1 | 8/2007 | Tanaka et al. |
| 2007/0180120 A1 | 8/2007 | Bainbridge et al. |
| 2007/0186212 A1 | 8/2007 | Mazzaferri et al. |
| 2007/0197261 A1 | 8/2007 | Humbel |
| 2007/0214332 A1 | 9/2007 | Sonoda et al. |
| 2007/0276969 A1 | 11/2007 | Bressy et al. |
| 2007/0277223 A1 | 11/2007 | Datta et al. |
| 2008/0014867 A1 | 1/2008 | Finn |
| 2008/0022374 A1 | 1/2008 | Brown et al. |
| 2008/0092213 A1 | 4/2008 | Wei et al. |
| 2008/0097793 A1 | 4/2008 | Dicks et al. |
| 2008/0121687 A1 | 5/2008 | Buhot |
| 2008/0162361 A1 | 7/2008 | Sklovsky |
| 2008/0176538 A1 | 7/2008 | Terrill et al. |
| 2008/0188178 A1 | 8/2008 | Maugars et al. |
| 2008/0201212 A1 | 8/2008 | Hammad et al. |
| 2008/0212503 A1 | 9/2008 | Lipford et al. |
| 2009/0055278 A1 | 2/2009 | Nemani |
| 2009/0070272 A1 | 3/2009 | Jain |
| 2009/0089449 A1 | 4/2009 | Day |
| 2009/0113425 A1 | 4/2009 | Ports et al. |
| 2009/0182634 A1 | 7/2009 | Park et al. |
| 2009/0193491 A1 | 7/2009 | Rao |
| 2009/0281947 A1 | 11/2009 | Erel |
| 2009/0300599 A1 | 12/2009 | Piotrowski |
| 2009/0320028 A1 | 12/2009 | Gellerich et al. |
| 2010/0031325 A1 | 2/2010 | Maigne et al. |
| 2010/0052844 A1 | 3/2010 | Wesby |
| 2010/0082977 A1 | 4/2010 | Boyle et al. |
| 2010/0128598 A1 | 5/2010 | Gandhewar et al. |
| 2010/0142517 A1 | 6/2010 | Montemurro et al. |
| 2010/0153721 A1 | 6/2010 | Mellqvist |
| 2010/0162028 A1 | 6/2010 | Frank et al. |
| 2010/0198943 A1 | 8/2010 | Harrang et al. |
| 2010/0223348 A1 | 9/2010 | Przybysz et al. |
| 2010/0228937 A1 | 9/2010 | Bae et al. |
| 2010/0241847 A1 | 9/2010 | van der Horst et al. |
| 2010/0246818 A1 | 9/2010 | Yao |
| 2010/0269156 A1 | 10/2010 | Hohlfeld et al. |
| 2010/0274726 A1 | 10/2010 | Florek et al. |
| 2010/0281139 A1 | 11/2010 | Deprun |
| 2010/0299313 A1 | 11/2010 | Orsini et al. |
| 2010/0318802 A1 | 12/2010 | Balakrishnan |
| 2011/0014948 A1 | 1/2011 | Yeh |
| 2011/0021175 A1 | 1/2011 | Florek et al. |
| 2011/0035604 A1 | 2/2011 | Habraken |
| 2011/0055084 A1 | 3/2011 | Singh |
| 2011/0078081 A1 | 3/2011 | Pirzadeh et al. |
| 2011/0082711 A1 | 4/2011 | Poeze et al. |
| 2011/0112968 A1 | 5/2011 | Floreck et al. |
| 2011/0113479 A1 | 5/2011 | Ganem |
| 2011/0154032 A1 | 6/2011 | Mauro, II |
| 2011/0202916 A1 | 8/2011 | VoBa et al. |
| 2011/0212707 A1 | 9/2011 | Mahalal |
| 2011/0216701 A1 | 9/2011 | Patel et al. |
| 2011/0226853 A1 | 9/2011 | Soh et al. |
| 2011/0237190 A1 | 9/2011 | Jolivet |
| 2011/0237296 A1 | 9/2011 | Coppinger |
| 2011/0238573 A1 | 9/2011 | Varadarajan |
| 2011/0238992 A1 | 9/2011 | Jancula et al. |
| 2011/0246609 A1 | 10/2011 | Kim |
| 2011/0251892 A1* | 10/2011 | Laracey ................... 705/14.51 |
| 2011/0281558 A1 | 11/2011 | Winter |
| 2011/0294418 A1 | 12/2011 | Chen |
| 2012/0003983 A1 | 1/2012 | Sherlock et al. |
| 2012/0011572 A1 | 1/2012 | Chew et al. |
| 2012/0021683 A1 | 1/2012 | Ma et al. |
| 2012/0028575 A1 | 2/2012 | Chen et al. |
| 2012/0029997 A1 | 2/2012 | Khan et al. |
| 2012/0036347 A1 | 2/2012 | Swanson et al. |
| 2012/0052801 A1 | 3/2012 | Kulkarni |
| 2012/0072481 A1 | 3/2012 | Nandlall et al. |
| 2012/0072979 A1 | 3/2012 | Cha et al. |
| 2012/0084211 A1 | 4/2012 | Petrov et al. |
| 2012/0084438 A1 | 4/2012 | Raleigh et al. |
| 2012/0084836 A1 | 4/2012 | Mahaffey et al. |
| 2012/0089700 A1 | 4/2012 | Safruti et al. |
| 2012/0108296 A1 | 5/2012 | Coppinger |
| 2012/0123868 A1 | 5/2012 | Brudnicki et al. |
| 2012/0130839 A1 | 5/2012 | Koh et al. |
| 2012/0131178 A1 | 5/2012 | Zhu et al. |
| 2012/0137119 A1 | 5/2012 | Doerr et al. |
| 2012/0143703 A1 | 6/2012 | Wall et al. |
| 2012/0149327 A1 | 6/2012 | Raboisson et al. |
| 2012/0158467 A1 | 6/2012 | Hammad et al. |
| 2012/0159163 A1 | 6/2012 | von Behren et al. |
| 2012/0159612 A1 | 6/2012 | Reisgies |
| 2012/0168494 A1 | 7/2012 | Kim |
| 2012/0178365 A1 | 7/2012 | Katz et al. |
| 2012/0178366 A1 | 7/2012 | Levy et al. |
| 2012/0190332 A1 | 7/2012 | Charles |
| 2012/0198519 A1 | 8/2012 | Parla et al. |
| 2012/0202423 A1 | 8/2012 | Tiedemann et al. |
| 2012/0203701 A1 | 8/2012 | Ayuso de Paul |
| 2012/0226582 A1 | 9/2012 | Hammad |
| 2012/0226772 A1 | 9/2012 | Grube et al. |
| 2012/0238206 A1 | 9/2012 | Singh et al. |
| 2012/0252480 A1 | 10/2012 | Krutt et al. |
| 2012/0258690 A1 | 10/2012 | Chen et al. |
| 2012/0266076 A1 | 10/2012 | Lockhart et al. |
| 2012/0266220 A1 | 10/2012 | Brudnicki et al. |

(56) References Cited

U.S. PATENT DOCUMENTS

| | | |
|---|---|---|
| 2012/0284195 A1 | 11/2012 | McMillen et al. |
| 2012/0291095 A1 | 11/2012 | Narendra et al. |
| 2012/0295588 A1 | 11/2012 | Chen et al. |
| 2012/0297187 A1 | 11/2012 | Paya et al. |
| 2012/0303961 A1 | 11/2012 | Kean et al. |
| 2012/0304286 A1 | 11/2012 | Croll et al. |
| 2012/0324293 A1 | 12/2012 | Grube et al. |
| 2013/0014259 A1 | 1/2013 | Gribble et al. |
| 2013/0035056 A1 | 2/2013 | Prasad et al. |
| 2013/0047197 A1 | 2/2013 | Saroiu et al. |
| 2013/0054474 A1 | 2/2013 | Yeager |
| 2013/0062417 A1 | 3/2013 | Lee et al. |
| 2013/0086684 A1 | 4/2013 | Mohler |
| 2013/0097302 A9 | 4/2013 | Khedouri et al. |
| 2013/0109307 A1 | 5/2013 | Reisgies et al. |
| 2013/0117186 A1 | 5/2013 | Weinstein et al. |
| 2013/0138521 A1 | 5/2013 | Want et al. |
| 2013/0138959 A1 | 5/2013 | Pelly et al. |
| 2013/0140360 A1 | 6/2013 | Graylin |
| 2013/0143489 A1 | 6/2013 | Morris et al. |
| 2013/0145429 A1 | 6/2013 | Mendel et al. |
| 2013/0159186 A1 | 6/2013 | Brudnicki et al. |
| 2013/0159710 A1 | 6/2013 | Khan |
| 2013/0160120 A1 | 6/2013 | Malaviya et al. |
| 2013/0174147 A1 | 7/2013 | Sahita et al. |
| 2013/0212704 A1 | 8/2013 | Shablygin et al. |
| 2013/0263212 A1 | 10/2013 | Faltyn et al. |
| 2013/0305333 A1 | 11/2013 | Katzer et al. |
| 2013/0332456 A1 | 12/2013 | Arkin |
| 2013/0345530 A1 | 12/2013 | McRoberts et al. |
| 2014/0033316 A1 | 1/2014 | Paczkowski et al. |
| 2014/0047548 A1 | 2/2014 | Bye et al. |
| 2014/0188738 A1 | 7/2014 | Huxham |

OTHER PUBLICATIONS

FAIPP Pre-Interview Communication dated Nov. 20, 2012, U.S. Appl. No. 13/344,096, filed Jan. 5, 2012.

Bierbaum, Christopher J, et al., "Electronic Payment Using a Proxy Account Number Stored in a Secure Element," filed Jan. 5, 2012, U.S. Appl. No. 13/344,096.

Notice of Allowance dated Nov. 29, 2013, U.S. Appl. No. 13/440,980, filed Apr. 5, 2012.

Office Action dated Dec. 19, 2013, U.S. Appl. No. 13/557,213, filed Jul. 25, 2012.

FAIPP Pre-Interview Communication dated Nov. 27, 2013, U.S. Appl. No. 13/610,856, filed Sep. 11, 2012.

Notice of Allowance date Jan. 31, 2014, U.S. Appl. No. 13/610,856, filed Sep. 11, 2012.

Cope, Warren B., et al., "Extended Trusted Security Zone Radio Modem", filed Nov. 26, 2013, U.S. Appl. No. 14/090,667.

Paczkowski, Lyle W., et al., "Trusted Security Zone Containers for the Protection and Confidentiality of Trusted Service Manager Data", filed Feb. 16, 2014, PCT Application No. PCT/US14/16651.

Foreign Communication from a Related Counterpart—International Search Report and Written Opinion, dated Dec. 2, 2013, PCT/US13/40673, filed on May 10, 2013.

Giesecke & Devrient, "The OTA Platform in the World of LTE", Jan. 2011, http://www.gi-de.com/gd_media/media/en/documents/brochures/mobile_security_2/cste_1/OTA-and-LTE.pdf.

Pesonen, Lauri, "Development of Mobile Payment Ecosystem—NFC Based Payment Services", Aug. 27, 2008.

Foreign Communication from a Related Counterpart—International Search Report and Written Opinion, dated Feb. 4, 2014, PCT/US13/47729, filed on Jun. 25, 2013.

Foreign Communication from a Related Counterpart—International Search Report and Written Opinion, dated Feb. 4, 2014, PCT/US13/51750, filed on Jul. 24, 2013.

Final Office Action dated Sep. 9, 2013, U.S. Appl. No. 13/440,980, filed Apr. 5, 2012.

Office Action dated Sep. 25, 2013, U.S. Appl. No. 13/571,348, filed Aug. 10, 2012.

Notice of Allowance dated Aug. 30, 2013; U.S. Appl. No. 13/540,437, filed Jul. 2, 2012.

Restriction Requirement dated Nov. 1, 2013, U.S. Appl. No. 13/557,213, filed Jul. 25, 2012.

Notice of Allowance dated Oct. 16, 2013, U.S. Appl. No. 13/556,200, filed Jul. 24, 2012.

FAIPP Pre-Interview Communication dated Oct. 24, 2012, U.S. Appl. No. 13/463,801, filed May 3, 2012.

Bye, Stephen James, et al., "Near Field Communication Authentication and Validation to Access Corporate Data", filed May 3, 2012, U.S. Appl. No. 13/463,801.

Final Office Action dated Oct. 5, 2012, U.S. Appl. No. 13/250,611, filed Sep. 30, 2011.

FAIPP Pre-Interview Communication dated Oct. 24, 2012, U.S. Appl. No. 13/463,797, filed May 3, 2012.

Notice of Allowance dated Jun. 21, 2013, U.S. Appl. No. 13/250,611, filed Sep. 30, 2011.

FAIPP Office Action dated Jan. 31, 2013, U.S. Appl. No. 13/344,096, filed Jan. 5, 2012.

Notice of Allowance dated Jun. 11, 2013, U.S. Appl. No. 13/344,096, filed Jan. 5, 2012.

Notice of Allowance dated Mar. 1, 2013, U.S. Appl. No. 13/463,797, filed on May 3, 2012.

FAIPP Pre-Interview Communication dated Jun. 12, 2013, U.S. Appl. No. 13/440,980, filed Apr. 5, 2012.

Notice of Allowance dated Mar. 14, 2013, U.S. Appl. No. 13/463,801, filed May 3, 2012.

FAIPP Pre-Interview Communication dated Jul. 25, 2013, U.S. Appl. No. 13/470,203, filed May 11, 2012.

FAIPP Pre-Interview Communication dated Jun. 6, 2013, U.S. Appl. No. 13/571,348, filed Aug. 10, 2012.

FAIPP Pre-Interview Communication dated Jun. 5, 2013, U.S. Appl. No. 13/556,200, filed Jul. 24, 2012.

First Action Interview Office Action dated Aug. 19, 2013, U.S. Appl. No. 13/556,200, filed Jul. 24, 2012.

First Action Interview Pre-Interview Communication dated Dec. 27, 2011, U.S. Appl. No. 12/486,873, filed Jun. 18, 2009.

First Action Interview Office Action dated Feb. 13, 2012, U.S. Appl. No. 12/486,873, filed Jun. 18, 2009.

Office Action dated Jul. 5, 2012, U.S. Appl. No. 12/486,873, filed Jun. 18, 2009.

Final Office Action dated Feb. 1, 2013, U.S. Appl. No. 12/486,873, filed Jun. 18, 2009.

Katzer, Robin Dale, et al., "Secure Online Credit Card Transactions," filed Jan. 25, 2013, U.S. Appl. No. 13/750,831.

Katzer, Robin D., et al., "Web Server Bypass of Backend Process on Near Field Communications and Secure Elements Chips", filed May 11, 2012, U.S. Appl. No. 13/470,203.

Katzer, Robin D., et al., "Web Server Bypass of Backend Process on Near Field Communications and Secure Elements Chips", filed May 10, 2013, PCT Application No. PCT/US13/40673.

Katzer, Robin D., et al., "Secure Placement of Centralized Media Controller Application in Mobile Access Terminal", filed Nov. 11, 2011, U.S. Appl. No. 13/294,177.

McRoberts, Leo Michael, et al., "End-to-End Trusted Communications Infrastructure", filed Jun. 25, 2012, U.S. Appl. No. 13/532,588.

McRoberts, Leo Michael, et al., "End-to-End Trusted Communications Infrastructure", filed on Jun. 25, 2013, PCT Serial No. PCT/US13/47729.

Paczkowski, Lyle W., et al., "Trusted Policy and Charging Enforcement Function", filed Jun. 27, 2012, U.S. Appl. No. 13/533,969.

Bye, Stephen James, et al., "Systems and Methods for Provisioning and Using Multiple Trusted Security Zones on an Electronic Device", filed Aug. 10, 2012, U.S. Appl. No. 13/571,348.

Bye, Stephen James, et al., "Systems and Methods for Provisioning and Using Multiple Trusted Security Zones on an Electronic Device", filed on Aug. 5, 2013, PCT Serial No. PCT/US13/53617.

Bye, Stephen James, et al., "Trusted Signaling in Long Term Evolution (LTE) 4G Wireless Communication", filed Feb. 7, 2013, U.S. Appl. No. 13/762,319.

Cope, Warren B., et al., "Extended Trusted Security Zone Radio Modem", filed Jul. 2, 2012, U.S. Appl. No. 13/540,437.

(56) References Cited

OTHER PUBLICATIONS

Katzer, Robin D., et al., "Trusted Access to Third Party Applications Systems and Methods", filed Jul. 25, 2012, U.S. Appl. No. 13/557,213.
Paczkowski, Lyle W., et al., "System and Methods for Trusted Internet Domain Networking", filed Sep. 11, 2012, U.S. Appl. No. 13/610,856.
Paczkowski, Lyle W., et al., "Trusted Security Zone Access to Peripheral Devices", filed Jul. 24, 2012, U.S. Appl. No. 13/556,200.
Paczkowski, Lyle W., et al., "Trusted Security Zone Access to Peripheral Devices", filed Jul. 24, 2013, PCT Application No. PCT/US13/51750.
Paczkowski, Lyle W., et al., Enablement of a Trusted Security Zone Authentication for Remote Mobile Device Management Systems and Methods, filed Mar. 15, 2013, U.S. Appl. No. 13/844,357.
Paczkowski, Lyle W., et al., "Trusted Security Zone Communication Addressing on an Electronic Device", filed Mar. 15, 2013, U.S. Appl. No. 13/844,145.
Bye, Stephen James, et al., "Protection for Multimedia Files Pre-Downloaded to a Mobile Device", filed Apr. 15, 2013, U.S. Appl. No. 13/863,376.
Paczkowski, Lyle W., et al., "Point-of-Sale and Automated Teller Machine Transactions Using Trusted Mobile Access Device", filed Mar. 13, 2013, U.S. Appl. No. 13/802,383.
Paczkowski, Lyle W., et al., "Trusted Security Zone Re-Provisioning and Re-Use Capability for Refurbished Mobile Devices", filed Mar. 14, 2013, U.S. Appl. No. 13/831,486.
Paczkowski, Lyle W., et al., "Trusted Security Zone Enhanced with Trusted Hardware Drivers", filed Mar. 13, 2013, U.S. Appl. No. 13/802,404.
Paczkowski, Lyle W., et al., "Restricting Access of a Portable Communication Device to Confidential Data or Applications via a Remote Network Based on Event Triggers Generated by the Portable Communication Device", filed Mar. 15, 2013, U.S. Appl. No. 13/844,282.
Paczkowski, Lyle W., et al., "JTAG Fuse Vulnerability Determination and Protection Using a Trusted Execution Environment", filed Mar. 15, 2013, U.S. Appl. No. 13/844,325.
Paczkowski, Lyle W., et al., "Trusted Security Zone Containers for the Protection and Confidentiality of Trusted Service Manager Data", filed Mar. 14, 2013, U.S. Appl. No. 13/831,463.
Bye, Stephen James, et al., "Delivering Digital Content to a Mobile Device via a Digital Rights Clearing House", filed Apr. 10, 2013, U.S. Appl. No. 13/860,338.
Paczkowski, Lyle W., et al., "Method for Enabling Hardware Assisted Operating System Region for Safe Execution of Untrusted Code Using Trusted Transitional Memory", filed May 20, 2013, U.S. Appl. No. 13/898,435.
Paczkowski, Lyle W., et. al, "Verifying Applications Using a Trusted Security Zone", filed Aug. 12, 2013, U.S. Appl. No. 13/964,112.
Paczkowski, Lyle W., et. al, "Mobile Access Terminal with Local Call Session Control Function", filed Jun. 18, 2009, U.S. Appl. No. 12/486,873.
Ching, Andrew T., et al., "Payment Card Rewards Programs and Consumer Payment Choice", Journal of Banking & Finance, vol. 34, Issue 8, Aug. 2010, pp. 1773-1787, ISSN 0378-4266, http://dx.doi.org/10.1016/j.jbankfin.2010.03.015.
Zimmerman, Ann, "Check Out the Future of Shopping", The Wall Street Journal, Business, May 18, 2011, http://online.wsj.com/article/SB10001424052748703421204576329253050634700.html.
Garry, Michael, Kroger Test Prepares for Mobile Future:, SN, Supermarket News, Jun. 13, 2011, http://supermarketnews.com/technology/kroger-test-prepares-mobile-future.
Jones, Sally, "Industry Trends in POS Hardware for Mobile Devices", Aug. 31, 2011, http://pointofsale.com/20110831734/Mobile-POS-News/industry-trends-in-pos-hardware-for-mobile-devices.html.
Final Office Action dated Mar. 27, 2014, U.S. Appl. No. 13/470,203, filed May 11, 2012.
Notice of Allowance dated Jan. 28, 2014, U.S. Appl. No. 12/486,873, filed Jun. 18, 2009.
Paczkowski, Lyle W., et al., "Trusted Security Zone Access to Peripheral Devices", filed Jan. 6, 2014, U.S. Appl. No. 14/148,714.
Office Action dated Oct. 12, 2006; U.S. Appl. No. 10/901,630, filed Jul. 28, 2004.
Office Action dated Apr. 5, 2007; U.S. Appl. No. 10/901,630, filed Jul. 28, 2004.
Office Action dated Oct. 9, 2007; U.S. Appl. No. 10/901,630, filed Jul. 28, 2000.
Notice of Allowance dated Apr. 8, 2008; U.S. Appl. No. 10/901,630, filed Jul. 28, 2004.
Office Action dated Apr. 16, 2009; U.S. Appl. No. 12/172,813, filed Jul. 14, 2008.
Notice of Allowance dated Sep. 9, 2009; U.S. Appl. No. 12/172,813, filed Jul. 14, 2008.
Office Action dated Aug. 20, 2010; U.S. Appl. No. 12/631,372, filed Dec. 4, 2009.
Notice of Allowance dated Dec. 14, 2010; U.S. Appl. No. 12/631,372, filed Dec. 4, 2009.
Office Action dated Jul. 7, 2011; U.S. Appl. No. 13/045,306, filed Mar. 10, 2010.
Notice of Allowance dated Oct. 27, 2011; U.S. Appl. No. 13/045,306, filed Mar. 10, 2010.
Office Action dated Mar. 5, 2012; U.S. Appl. No. 13/250,611, filed Sep. 30, 2011.
Cope, Warren B., et al., "Method of Transaction Processing to Support Proxy Financial Card", filed Sep. 30, 2011, U.S. Appl. No. 13/250,611.
Cope, Warren B., et al., "Alternative hardware and Software Configuration for Near Field Communication", filed May 4, 2012, U.S. Appl. No. 13/463,797.
Cope, Warren B., et al., "Multiple Secure Elements in Mobile Electronic Device with Near Field Communication Capability", filed Apr. 5, 2012, U.S. Appl. No. 13/440,980.
Advisory Action dated May 29, 2014, U.S. Appl. No. 13/470,203, filed May 11, 2012.
FAIPP Pre-Interview Communication dated May 12, U.S. Appl. No. 13/294,177, filed Nov. 11, 2011.
Final Office Action dated Apr. 10, 2014, U.S. Appl. No. 13/571,348, filed Aug. 10, 2012.
FAIPP Pre-Interview Communication dated Apr. 3, 2014, U.S. Appl. No. 13/802,383, filed Mar. 13, 2013.
First Action Interview Office Action dated May 23, 2014, U.S. Appl. No. 13/802,383, filed Mar. 13, 2013.
Foreign Communication from a Related Counterpart—International Search Report and Written Opinion, dated Apr. 22, 2014, PCT/US13/53617, filed on Aug. 5, 2013.
Advisory Action dated Jun. 23, 2014, U.S. Appl. No. 13/571,348, filed Aug. 10, 2012.
Notice of Allowance dated Jun. 4, 2014, U.S. Appl. No. 13/557,213 filed Jul. 25, 2012.
FAIPP Pre-Interview Communication dated Aug. 4, 2014, U.S. Appl. No. 13/844,357, filed Mar. 15, 2013.
Notice of Allowance dated Jul. 8, 2014, U.S. Appl. No. 13/802,383, filed Mar. 13, 2013.
Restriction Requirement dated Aug. 14, 2014, U.S. Appl. No. 13/594,777, filed Aug. 25, 2012.
FAIPP Pre-Interview Communication dated Jul. 17, 2014, U.S. Appl. No. 13/594,778, filed Aug. 25, 2012.
FAIPP Pre-Interview Communication dated Jul. 17, 2014, U.S. Appl. No. 13/594,779, filed Aug. 25, 2012.
FAIPP Pre-Interview Communication dated Aug. 6, 2014, U.S. Appl. No. 13/831,486, filed Mar. 14, 2013.
Foreign Communication from a Related Counterpart—International Search Report and Written Opinion, dated Jul. 11, 2014, PCT/US14/16651, filed on Feb. 16, 2014.

\* cited by examiner

US 8,862,181 B1

ELECTRONIC PURCHASE TRANSACTION TRUST INFRASTRUCTURE

CROSS-REFERENCE TO RELATED APPLICATIONS

None.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Mobile communication devices are becoming increasingly common and increasingly powerful. Mobile phones may comprise several peripherals such as cameras and near field communication (NFC) radio transceivers. Some manufacturers and/or food producing enterprises offer price discounts on purchases of related items. For example, a price discount may be offered to purchase both hot dogs and a preferred brand of hot dog buns to incent a shopper to purchase the preferred brand of hot dog buns. Some manufacturers and/or food producing enterprises may offer price discounts to use specific payment accounts, for example a specific credit card account.

SUMMARY

In an embodiment, a mobile phone comprising a processor, a non-transitory memory, and an application stored in the non-transitory memory is disclosed. When executed by the processor, the application receives an indicia of a product provided by a peripheral device of the mobile phone, identifies a product based on the indicia, analyzes options for paying electronically for the product, and presents a proposal for paying electronically for the product.

In an embodiment, a method of completing a payment transaction is disclosed. The method comprises scanning by a mobile phone indicia of a plurality of products, identifying the products based on the indicia, analyzing payment rules to determine a proposal for paying electronically for the products, where a plurality of payment accounts are used for paying, and transmitting at least two payment transaction messages to two payment accounts via a cellular radio transceiver of the mobile phone to complete payment for the products, wherein each of the at least two payment transaction messages identifies a payment account.

In an embodiment, a method of completing a payment transaction is disclosed. The method comprises scanning by a mobile phone indicia of a plurality of products, accumulating information about the products in a trusted security zone of the mobile phone, and transmitting the accumulated information about the products from the trusted security zone of the mobile phone via a trusted communication infrastructure to a server computer in a wireless service provider network, where the server computer comprises a trusted security zone. The method further comprises validating the accumulated information about the products by the server computer, completing at least one payment transaction based on the accumulated information about the products by the server computer, and transmitting a message to an enterprise in which the products are being sold of the completion about the at least one payment transaction.

These and other features will be more clearly understood from the following detailed description taken in conjunction with the accompanying drawings and claims.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

DETAILED DESCRIPTION

Figure 1A:
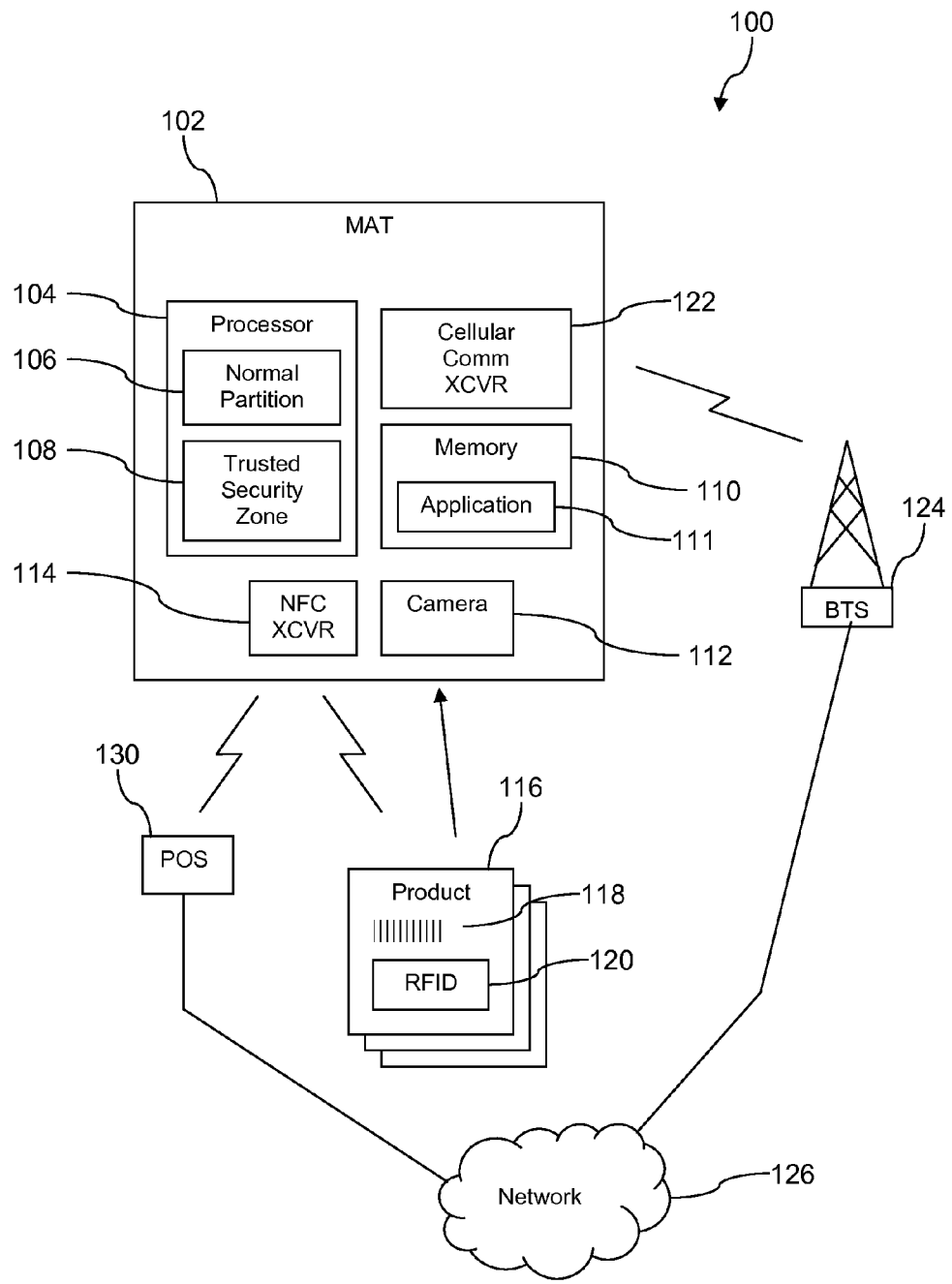
FIG. 1A and FIG. 1B illustrate a communication system according to an embodiment of the disclosure.

It should be understood at the outset that although illustrative implementations of one or more embodiments are illustrated below, the disclosed systems and methods may be implemented using any number of techniques, whether currently known or not yet in existence. The disclosure should in no way be limited to the illustrative implementations, drawings, and techniques illustrated below, but may be modified within the scope of the appended claims along with their full scope of equivalents.

In an embodiment, systems and methods for completing electronic payments for products in retail stores are disclosed. A user scans product identifiers using a mobile access terminal as he or she places the product item in their shopping cart. For example, the mobile access terminal may take a picture of a bar code on the product item and the mobile access terminal analyzes the bar code to identify the subject product item. The mobile access terminal may store a map that translates the bar code to product information and/or product identity. Alternatively, the mobile access terminal may request the product information and/or product identity in an information request message that includes the bar code and transmit the message to a server computer via a wireless communication link. The server computer may analyze the bar code to identify the subject product item, translate the bar code to product information and/or product identity, and transmit the subject information and/or identity back to the mobile access terminal. Alternatively, the mobile access terminal may read a radio frequency identity (RFID) tag coupled to the product item and in like manner obtain associated product information and/or product identity.

As the user continues shopping, scanning items, and adding product items to their shopping cart, analysis may be performed by the mobile access terminal and/or by the server computer to determine preferred payment strategies and/or to recommend associated product purchases. The mobile access terminal may present on a display one or more payment options for a product and provide a means, for example a control button or a dialog box, to select one of the payment options or override a payment option selected automatically based on pre-configured and/or pre-defined payment rules. The analysis may suggest as an aid to the shopper that, having scanned hot dogs, they may wish to purchase hot dog buns. The analysis may determine that a price discount is available for purchasing a preferred brand of hot dog buns in combination with the scanned hot dogs, for example as part of a marketing effort to introduce a new brand of hot dog buns. The mobile access terminal may present a notification on a screen that advises a user of the discount that is available. This may allow the user to take advantage of a discount that he or she otherwise may have been unaware of.

When the shopping is completed, for example when the user indicates the shopping cart is ready for checkout, the mobile access terminal may complete payment for the product items electronically via a wireless communication link. The mobile access terminal may pay for different product items from different payment accounts to benefit from discounts offered in association with different products. The mobile access terminal may pay for different product items based on electronic coupons that have been accumulated in the mobile access terminal or in a network based storage area associated with the user of the mobile access terminal. In an embodiment, by using the mobile access terminal to complete payment for the products, the user may be able to skip the delay of passing through a checkout line and/or checkout process.

In an embodiment, the mobile access terminal has a trusted security zone that promotes the shopping paradigm described above. For example, electronic coupons and/or payment account information may be stored in a trusted security zone on the mobile access terminal. The mobile access terminal trusted security zone may take control and establish a trusted communication link to a cellular base transceiver station (BTS) and to a trusted security zone on a server computer in the network of a wireless service provider that operates the base transceiver station.

A trusted security zone provides chipsets with a hardware root of trust, a secure execution environment for applications, and secure access to peripherals. A hardware root of trust means the chipset should only execute programs intended by the device manufacturer or vendor and resists software and physical attacks, and therefore remains trusted to provide the intended level of security. The chipset architecture is designed to promote a programmable environment that allows the confidentiality and integrity of assets to be protected from specific attacks. Trusted security zone capabilities are becoming features in both wireless and fixed hardware architecture designs. Providing the trusted security zone in the main mobile device chipset and protecting the hardware root of trust removes the need for separate secure hardware to authenticate the device or user. To ensure the integrity of the applications requiring trusted data, such as a mobile financial services application, the trusted security zone also provides the secure execution environment where only trusted applications can operate, safe from attacks. Security is further promoted by restricting access of non-trusted applications to peripherals, such as data inputs and data outputs, while a trusted application is running in the secure execution environment.

A complete Trusted Execution Environment (TEE) may be implemented through the use of the trusted security zone hardware and software architecture. The Trusted Execution Environment is an execution environment that is parallel to the execution environment of the main mobile device operating system. Through standardization of application programming interfaces (APIs), the Trusted Execution Environment becomes a place to which scalable deployment of secure services can be targeted. A device which has a chipset that has a Trusted Execution Environment on it may exist in a trusted services environment, where devices in the trusted services environment are trusted and protected against attacks. The Trusted Execution Environment can be implemented on mobile phones and tablets as well as extending to other trusted devices such as personal computers, servers, sensors, medical devices, point-of-sale terminals, industrial automation, handheld terminals, automotive, etc.

The trusted security zone is implemented by partitioning all of the hardware and software resources of the mobile device into two partitions: a secure partition and a normal partition. Placing sensitive resources in the secure partition can protect against possible attacks on those resources. For example, resources such as trusted software applications may run in the secure partition and have access to hardware peripherals such as a touchscreen or a secure location in memory. Less secure peripherals such as wireless radios may be disabled completely while the secure partition is being accessed, while other peripherals may only be accessed from the secure partition. While the secure partition is being accessed through the Trusted Execution Environment, the main mobile operating system in the normal partition is suspended, and applications in the normal partition are prevented from accessing the secure peripherals and data. This prevents corrupted applications or malware applications from breaking the trust of the device.

The trusted security zone is implemented by partitioning the hardware and software resources to exist in a secure subsystem which is not accessible to components outside the secure subsystem. The trusted security zone is built into the processor architecture at the time of manufacture through hardware logic present in the trusted security zone which enables a perimeter boundary between the secure partition and the normal partition. The trusted security zone may only be manipulated by those with the proper credential and, in an embodiment, may not be added to the chip after it is manufactured. Software architecture to support the secure partition may be provided through a dedicated secure kernel running trusted applications. Trusted applications are independent secure applications which can be accessed by normal applications through an application programming interface in the Trusted Execution Environment on a chipset that utilizes the trusted security zone.

In an embodiment, the normal partition applications run on a first virtual processor, and the secure partition applications run on a second virtual processor. Both virtual processors may run on a single physical processor, executing in a time-sliced fashion, removing the need for a dedicated physical security processor. Time-sliced execution comprises switching contexts between the two virtual processors to share processor resources based on tightly controlled mechanisms such as secure software instructions or hardware exceptions. The context of the currently running virtual processor is saved, the context of the virtual processor being switched to is restored, and processing is restarted in the restored virtual processor. Time-sliced execution protects the trusted security zone by stopping the execution of the normal partition while the secure partition is executing.

The two virtual processors context switch via a processor mode called monitor mode when changing the currently running virtual processor. The mechanisms by which the processor can enter monitor mode from the normal partition are tightly controlled. The entry to monitor mode can be triggered by software executing a dedicated instruction, the Secure Monitor Call (SMC) instruction, or by a subset of the hardware exception mechanisms such as hardware interrupts, which can be configured to cause the processor to switch into monitor mode. The software that executes within monitor mode then saves the context of the running virtual processor and switches to the secure virtual processor.

The trusted security zone runs a separate operating system that is not accessible to the device users. For security purposes, the trusted security zone is not open to users for installing applications, which means users do not have access to install applications in the trusted security zone. This prevents corrupted applications or malware applications from executing powerful instructions reserved to the trusted security zone and thus preserves the trust of the device. The security of the system is achieved at least in part by partitioning the hardware and software resources of the mobile phone so they exist in one of two partitions, the secure partition for the security subsystem and the normal partition for everything else. Placing the trusted security zone in the secure partition and restricting access from the normal partition protects against software and basic hardware attacks. Hardware logic ensures that no secure partition resources can be accessed by the normal partition components or applications. A dedicated secure partition operating system runs in a virtual processor separate from the normal partition operating system that likewise executes in its own virtual processor. Users may install applications on the mobile device which may execute in the normal partition operating system described above. The trusted security zone runs a separate operating system for the secure partition that is installed by the mobile device manufacturer or vendor, and users are not able to install new applications in or alter the contents of the trusted security zone.

Figure 1B:
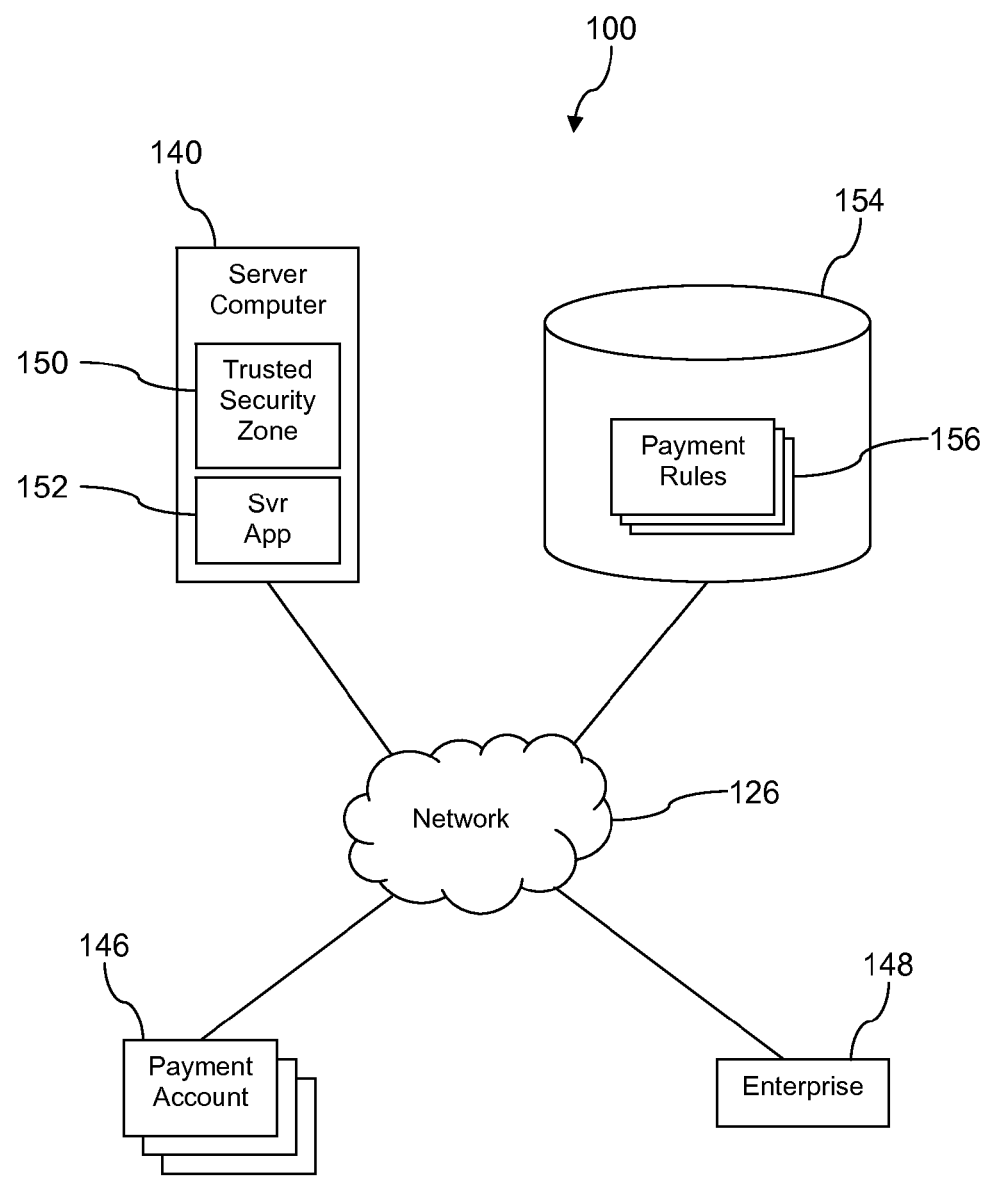

Turning now to FIG. 1A and FIG. 1B, a system 100 is described, in an embodiment, the system 100 comprises a mobile access terminal (MAT) 102, a base transceiver station 124, a network 126, and a server computer 140. In an embodiment, the MAT 102 may be used to scan products 116, reading a bar code 118 and/or a radio frequency identity (RFID) tag 120. The MAT 102 may be a mobile phone, a personal digital assistant (PDA), a media player, or some other portable communication device. The MAT 102 may use product information that it determines based on the scanning the products 116, for example product identity, product pricing information, and other information, to determine a payment strategy. The MAT 102 may determine which of a plurality of payment accounts 146 may be used to pay for the products 116. When payment from the payment accounts 146 for the purchased products 116 has been completed, either the MAT 102 or the server computer 140 may inform the enterprise 148 that retails the products 116. The enterprise 148 may use the information to track product inventory as well as thwart theft of products 116. In an embodiment, the system 100 may comprise a point-of-sale (POS) terminal 130. It will be appreciated that a variety of different embodiments of the system 100 are contemplated by the present disclosure.

The network 126 may comprise any combination of public and private communication networks. The server computer 140, the enterprise 148, and the point-of-sale terminal 130 may be implemented as computer systems. It is understood that the enterprise 148 may comprise business offices, warehouses, retail outlets, and the like, but the abstraction of the enterprise 148 represented in FIG. 1B may focus on a sales and product inventory management information system. Computer systems are described further hereinafter.

In an embodiment, the MAT 102 may comprise a processor 104, a memory 110, a camera 112, a near field communication (NFC) radio transceiver 114, and a cellular communication radio transceiver 122. The near field communication transceiver 114 may be used to establish a radio communication link over a short distance, for example a radio link with the point-of-sale terminal 130 and/or with the RFID tag 120. As used herein, the short distance over which the near field communication transceiver 114 may communicate may be limited to less than about 36 inches. Alternatively, the short distance over which the near field communication transceiver 114 may communicate may be limited to less than about 10 inches.

By contrast, the cellular transceiver 122 may be used to establish a radio communication link with the base transceiver station 124 over a relatively long distance, for example a distance greater than thirty feet. Under some wireless communication conditions, the cellular transceiver 122 may establish a radio communication link with the base transceiver station 124 over a distance of about one mile, over a distance of about three miles, over a distance of about five miles, or over yet greater distances. In an embodiment, the base transceiver station 124 may communication with the cellular transceiver 122 using one of a code division multiple access (CDMA) protocol, a global system for mobile communication (GSM) protocol, a long-term evolution (LTE) protocol, a worldwide interoperability for microwave access (WiMAX) protocol, or other cellular wireless communication protocol. In an embodiment, the base transceiver station 124 may comprise a femtocell or a small cellular base transceiver station suitable for use in building interiors where coverage from traditional macro-cell base transceiver stations may be poor.

In an embodiment, the processor 104 may be partitioned into a normal partition 106 and a trusted security zone 108. Trusted security zones are described generally above. An application 111 may be stored in the memory 110 and executed by the processor 104. Some parts of the application 111 may execute in the trusted security zone 108 and some parts of the application 111 may execute in the normal partition 106. The application 111 may process indicia associated with the product 116 read by the MAT 102, for example indicia received by the NFC transceiver 114 communicating with the RFID tag 120 and/or by stored by the camera capturing a digital image of the bar code 118. While the bar code 118 is illustrated in FIG. 1A as a traditional one-dimensional bar code, it is understood that the application 111 may process two-dimensional bar codes and other types of non-traditional bar codes. The application 111 may identify a product based on processing the indicia. In some contexts the term indicia may refer to the information read by or captured by the NFC transceiver 114 and/or the camera 112. In other contexts the term indicia may refer to the bar code 118 and/or the RFID tag 120.

The application 111 may look up the product identity and associated pricing and payment information using the processed indicia, for example in a data table stored in the memory 110. The application 111 may download a product table from the enterprise 148 while in a retail store. Alternatively, the application 111 may send a request for product identity and associated pricing and payment information to the server 140, where the request contains the processed indicia, for example a universal product code (UPC) or other identifier. In this case, the server 140 may maintain a product table and determine a product identity by indexing into the product table using the processed indicia provided by the application 111. The server 140 may return the requested product identity and associated pricing and payment information to the application 111.

As a user proceeds through a retail store selecting product items 116 to place in his or her shopping basket or shopping cart, the MAT 102 may scan the indicia associated with the product item 116. The application 111 may obtain product price and payment information as described above. The product price and payment information may include a price of the item and/or a quantity discount price for buying a specific number of the same product items, for example a discount price for buying two boxes of saltine crackers. The product price and payment information may include a coupon for another product that will be valid upon purchase of the subject product item 116. The product price and payment information may include information about a discounted price for a related product. For example, if the product item 116 is a package of hot dogs, the product price and payment information may include information about a 20% discount for a preferred brand of hot dog buns. The product price and payment information may include information about different prices for the product item 116 for use of different payment accounts 146. For example, the price of a soft drink may be less when purchased using a first payment account than when purchased using a second payment account, based on a marketing collaboration between a food product distributor and a financial institution or for some other reason.

The application 111 processes the product price and payment information and accumulates the information, for example in the trusted security zone 108 or in the memory 110. As the user's shopping activity continues—for example, as the user rolls their cart through a store or walks through the store carrying their basket, looking at products, consulting a shopping list—the application 111 may process the accumulated product price and payment information to identify preferred payment strategies. The application 111 may present the payment strategies on a display of the mobile access terminal 102 along with other related information such as running total, projected tax total, etc. The application 111 may present an input control, for example a soft button or a dialog box, for the user to override the suggested payment strategy. When the user overrides and selects a different payment vehicle than the one recommended, the application 111 may change the suggested payment vehicle for the subject product item 116 to the commanded payment vehicle and discontinue evaluating payment strategies for the subject product item 116 for the duration of the shopping session. Alternatively, the application 111 may continue evaluating payment strategies for the subject product item 116 and provide information to the user about cost differences between a recommended payment strategy and a commanded payment strategy for the one or more product items 116 where the user overrode the originally suggested payment strategy.

The application 111 may perform the analysis of alternative payment strategies based on rules stored in the memory 110 that may be predefined or configured by the user. For example, the user may define rules that provide that a category of product items 116 shall be paid for from a specific payment account 146. For example, the user may define that food items be paid for out of a debit card account while cosmetics may be paid for out of a specific credit card account. For example, the user may define that a credit card that accumulates incentives for use of the card may be used by preference to other credit cards that do not accumulate incentives for use. For example, the user may define that a product item 116 that costs less when paid for with a first payment vehicle than it costs when paid for with a second payment vehicle shall be paid for with the first payment vehicle.

In an embodiment, the application 111 may promote analysis of alternative payment strategies based on a hierarchy or precedence of rules. For example, if a first rule applies, the payment strategy to be suggested by the application 111 may be determined by the first rule without consulting other rules. When the first rule does not apply, the payment strategy to be suggested by the application 111 may be determined by the second rule without consulting other rules. For example, a first rule may be determined to apply but a plurality of payment vehicles may be consistent with the first rule and in this case a second rule that is consistent with the first rule may be used to select one payment vehicle out of the plurality of payment vehicles to determine a suggested payment strategy.

Exception conditions to the rules may be defined. For example, if a funds balance of a debit card has dipped below a predefined threshold limit, the application 111 may provisionally associate payment of a food item to a credit card. Likewise, if a price discount for a product item 116 is associated with a credit card account that does not accumulate incentives, the application 111 may provisionally associate payment of the product item 116 with the non-incentive accumulating credit card account in order to obtain the price discount. It is understood that the above are a few examples, and payment rules may take other forms.

When the application 111 identifies pricing discounts, a message may be presented on a display of the MAT 102 to notify the user. For example, when adding hot dogs to the cart, upon scanning the indicia associated with the product item 116, the application 111 may determine that a 20% discount is offered for purchase of a preferred brand of hot dog buns. This information may be presented on the display of the MAT 102 to inform the user. Likewise, if the application 111 determines that a quantity discount is available for the product item 116, this information may be presented on the display of the MAT 102. In an embodiment, as information about product items 116 in the shopping cart or shopping basket are accumulated, a running total of purchase price and/or taxes may be presented on the display of the MAT 102. In an embodiment, information about suggested distribution of the costs among the payment accounts 146 and/or funds balances of the payment accounts 146 may be presented on the display of the MAT 102.

While the functionality of accumulating product price and payment information to evaluate alternative payment strategies, of presenting discount information on the display of the device, of presenting information about total purchase price and taxes and of other information on the display of the device, and of actual payment completion has been described above as being processed by the application 111 executing unassisted on the MAT 102, in an embodiment some of this processing may be provided by a server application 152 executing on the server 140. For example, the server computer 140 may comprise a trusted security zone 150 in conformance with the general description of the trusted security zone discussed above. Some or all of the server application 152 may execute in the trusted security zone 150. The server application 152 may process the product price and payment information based on user defined rules 156 stored in a data store 154 associated with the server 140 to determine recommended and/or proposed payment strategies. The server 140 may transmit the recommended and/or proposed payment strategies to the MAT 102 for presentation to the user on the display of the MAT 102.

Figure 2A:
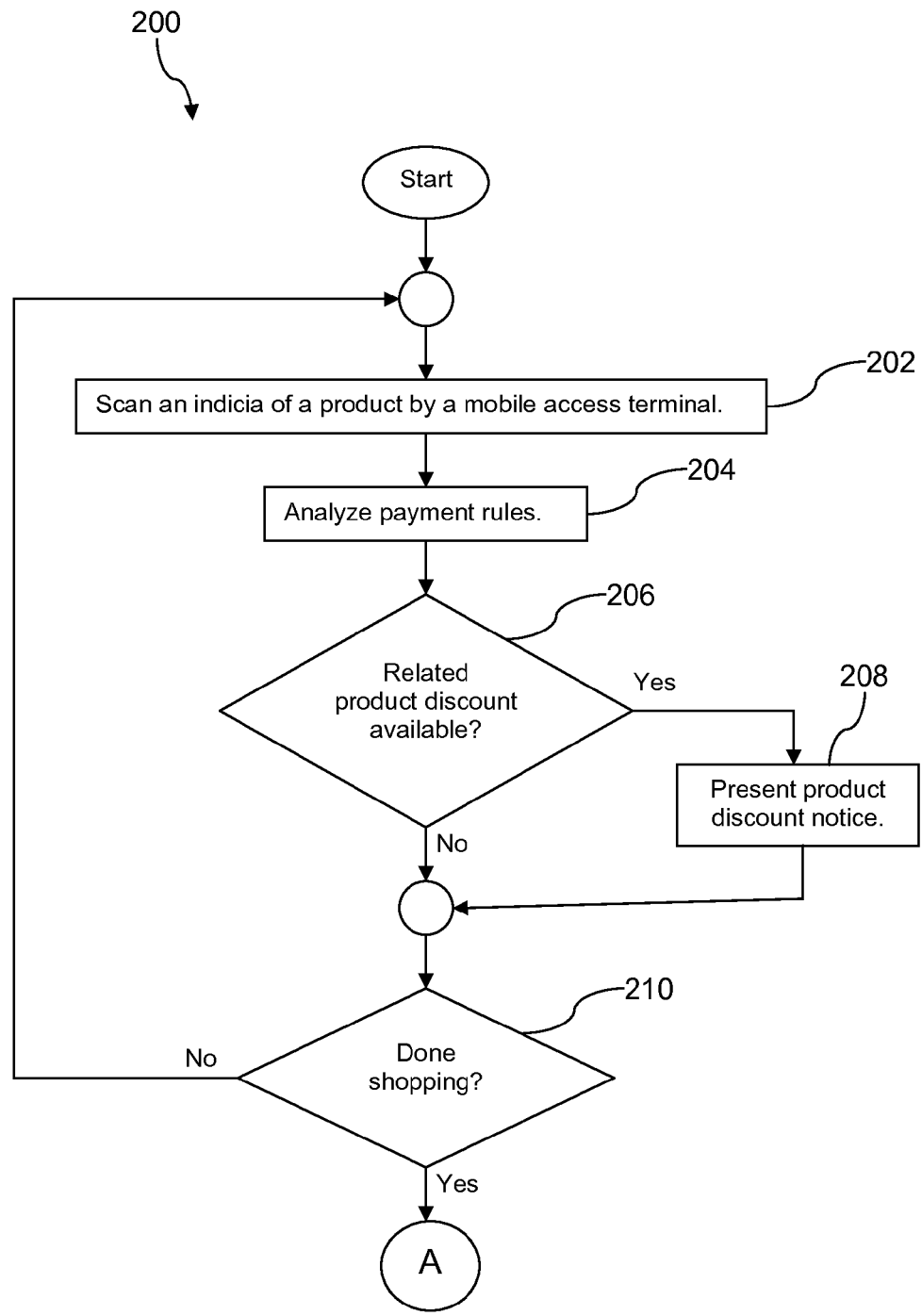
FIG. 2A and FIG. 2B are a flow chart of a method according to an embodiment of the disclosure.
Figure 2B:
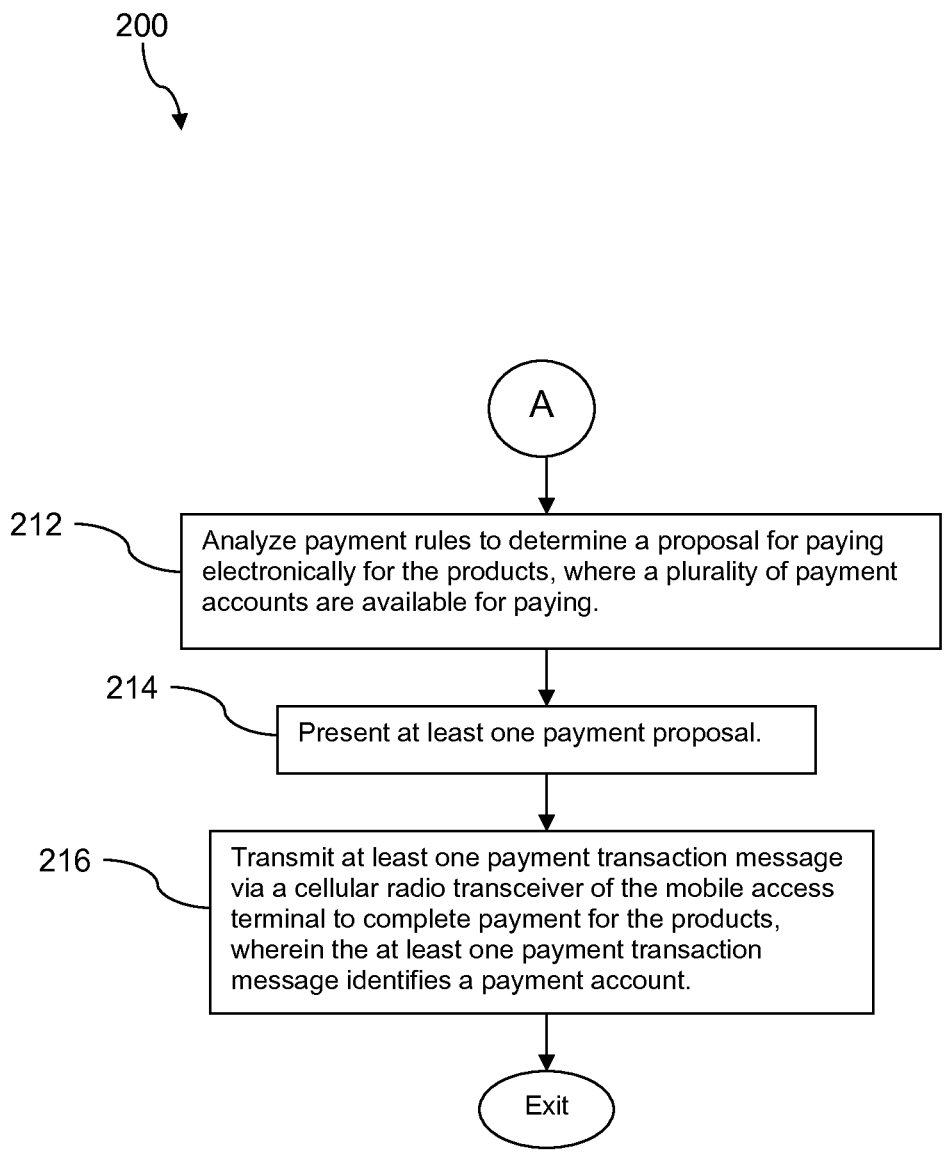

Turning now to FIG. 2A and FIG. 2B, a method 200 is described. In an embodiment, the method 200 may be practiced by the MAT 102 alone or in combination with the server 140. At block 202, an indicia 118, 120 of a product item 116 is scanned by the mobile access terminal 102. The processing of block 202 may be limited to receiving a radio signal from the RFID tag 120 or capturing a digital image of the bar code 118. Alternatively, the processing of block 202 may further comprise performing analysis of the indicia to determine some encoded information, for example a universal product code (UPC) encoded by the bar code 118 or an identity encoded in the radio signal emitted by the RFID tag 120. The processing of block 202 may further comprise retrieving product pricing and payment information associated with the indicia, for example by using the indicia to search in a map or data table. In an embodiment, the processing of block 202 may be performed at about the time a product item 116 is placed in a shopping cart.

At block 204, payment rules are analyzed, for example payment rules are evaluated to determine a payment strategy for the product item 116 scanned in block 202. In an embodiment, the processing of block 204 may further comprise reevaluating the payment rules to determine a payment strategy for not only the product item 116 scanned in block 202 but for a plurality of product items 116 that have been accumulated in a shopping basket and/or a shopping cart. For example, sometimes the payment strategy provisionally arrived at for product items 116 previously scanned and added to the shopping cart may be less optimal in the context of a product item 116 later scanned and added to the shopping cart.

At block 206, if a product discount is available for a related product, the processing proceeds to block 208 where a notice about the product discount is presented on the display of the MAT 102. In an embodiment, at block 206, if a quantity discount is available for the product item 116 scanned in block 202, the processing may proceed to block 208 and a notice about the quantity discount for the subject product item 116 is presented on a display of the MAT 102. The processing proceeds to block 210.

At block 210, if shopping is not complete, the processing returns to block 202. It is understood that the processing may wait at block 202 for an event, for example a user triggering a scanning operation. By repeatedly looping through blocks 202, 204, 206, 208, 210, the method 200 supports accumulating a plurality of product items 116 in a shopping basket and updating analysis of different payment strategies.

At block 212, payment rules may be analyzed again to determine a payment proposal for paying electronically for the products, where a plurality of payment accounts are available for paying. In an embodiment, the processing of block 212 may be substantially similar to the processing of block 204. At block 214, at least one payment proposal is presented, for example on a display of the MAT 102. A plurality of payment proposals may be presented, along with supporting information, to promote a user selecting from among the payment strategy alternatives. In an embodiment, the method may further comprise maintaining and analyzing a history of a user selection of a payment strategy to determine new payment rules in a learning mode of operation. In an embodiment, the MAT 102 may present an input control for overriding a suggested payment strategy as described above with reference to FIG. 1A and FIG. 1B.

In an embodiment, the processing of block 212 may occur before block 210. In this case, the analysis of product items 116 to determine payment proposals may be on-going, repeating the analysis each time a new product item 116 is placed in a shopping cart. This repeating analysis may result in changing the payment strategy for product items 116 previously scanned at block 202 due to marketing collaborations or related product discounts. By repeating the analysis, the user of the MAT 102 may be provided more accurate in-progress shopping cost information. Additionally, this may promote more rapid check-out at the point-of-sale terminal 130 as less analysis may need to be performed.

At block 216, at least one payment transaction message is transmitted via the cellular transceiver 122 of the MAT 102 to complete payment for the product items 116, wherein the at least one payment transaction message identifies a payment account. In an embodiment, the method 200 further comprises sending a payment confirmation message to the enterprise 148, informing them that the purchase items 116 have been paid for or are committed for payment settlement at a predefined standard settlement time. The enterprise 148 may send notification to a retail store that a given user and/or shopping basket is paid for and allow the user to leave the store and load the product items 116 into their vehicle to take home. Alternatively, the notification may be sent from the enterprise 148 to the point-of-sale terminal 130 indicating that payment is complete, perhaps triggering the point-of-sale terminal 130 to print out a receipt for the payment itemized by the product items 116. The use of method 200 may promote convenience of the user as well as reduce costs to the enterprise 148 of staffing point-of-sale terminals 130. The method 200 may promote improved marketing, as price discounts for related products and quantity price discounts, which may be marketing incentives intended to direct buying behavior, may be more surely brought to the attention of the user and hence have a better prospect for affecting buying behavior.

Figure 3:
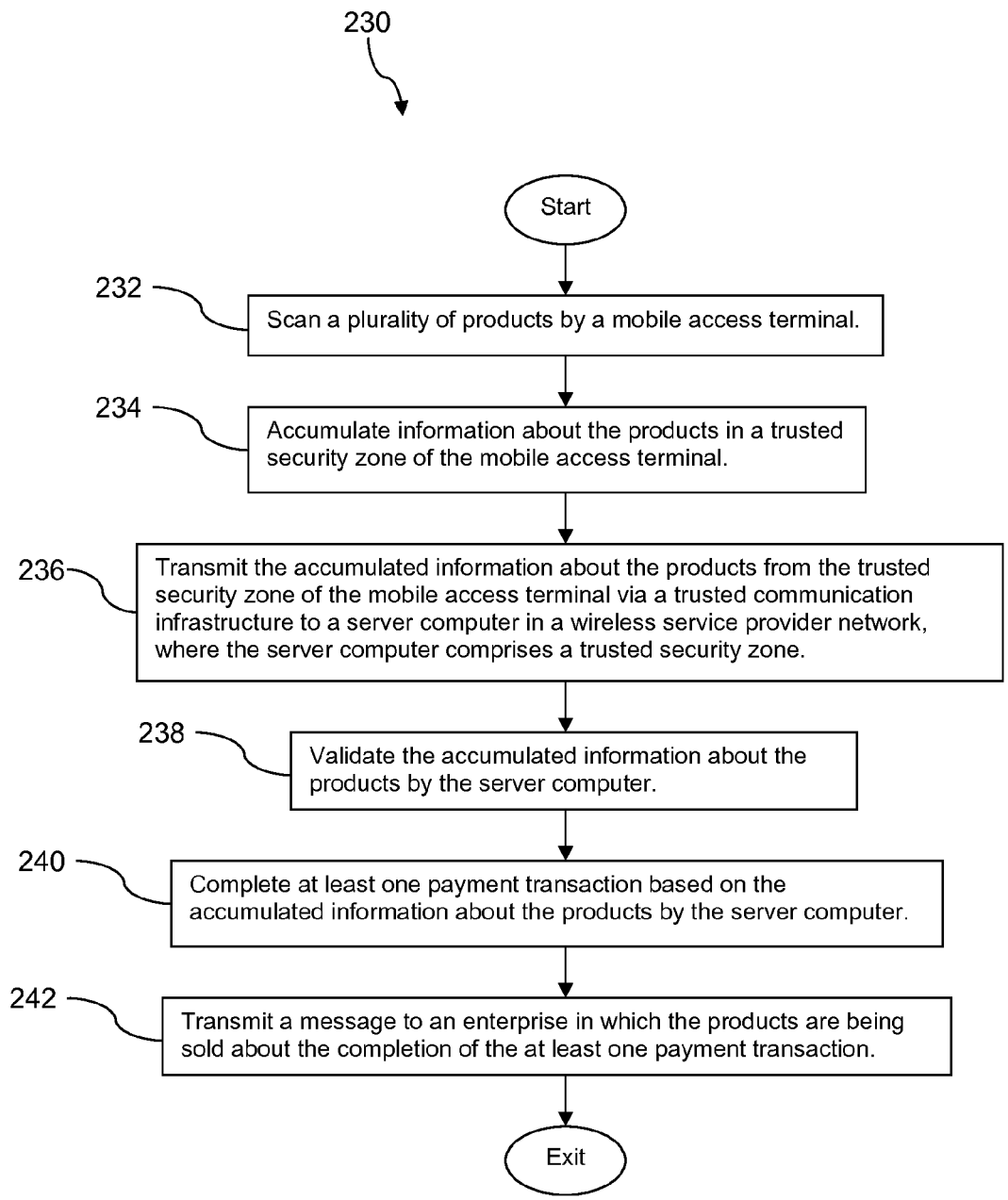
FIG. 3 is a flow chart of a method according to an embodiment of the disclosure.

Turning now to FIG. 3, a method 230 is described. At block 232, a plurality of product items are scanned by the MAT 102. At block 234, information about the product items is accumulated in the trusted security zone 108 of the MAT 102. The information may comprise one or more of an identity of the product item 116, a price of the product item 116, or a payment information related to the product item 116. Payment information related to the product item 116 may comprise information about related products that may receive a price discount when purchased at the same time as the subject product item 116, information about quantity discounts, and/or other product information.

At block 236, the accumulated information about the products is transmitted from the trusted security zone 108 of the MAT 102 via a trusted communication infrastructure to the server 140, where the server 140 is located in a wireless service provider network and the server 140 comprises the trusted security zone 150. In an embodiment, the trusted communication infrastructure may be constituted by passing through a plurality of network nodes each having a trusted security zone such that the information is only accessed by instructions executing in the trusted security zone of the subject network nodes. In another embodiment, however, the trusted security infrastructure may be provided in a different way. In an embodiment, the base transceiver station 124 may not comprise a trusted security zone, and it may be assumed that the base transceiver station 124 is inherently secure from hacking and safe from a security breach.

At block 238, the accumulated information is validated by the server 140. At block 240, at least one payment transaction is completed by the server 140 based on the accumulated information about the product items. At block 242, a message is transmitted to the enterprise 148 associated with the product items, wherein the message indicates the completion of the payment transaction or transactions.

Figure 4:
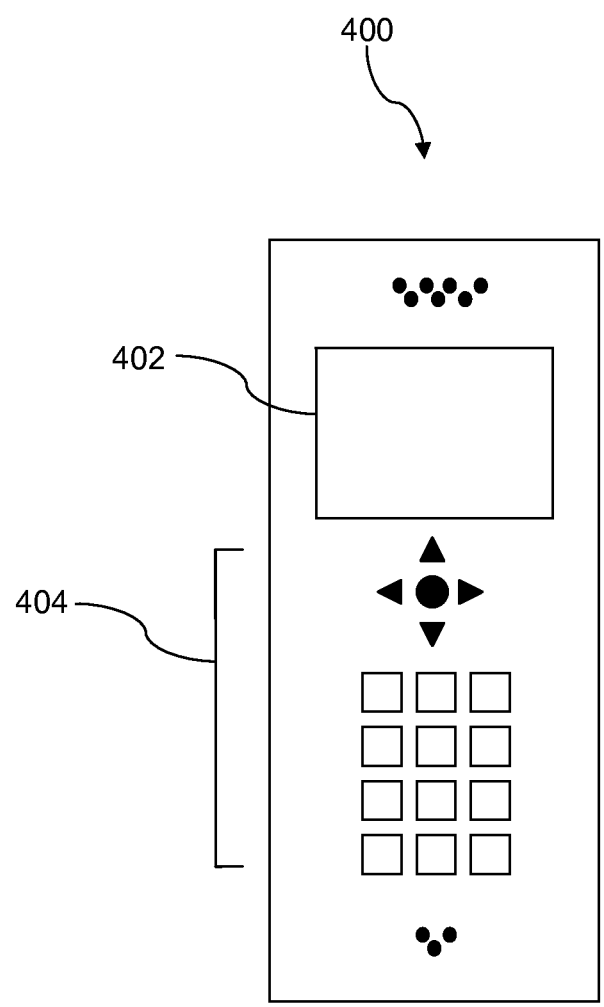
FIG. 4 is an illustration of a mobile phone according to an embodiment of the disclosure.

FIG. 4 depicts a mobile device 400, which is operable for implementing aspects of the present disclosure, but the present disclosure should not be limited to these implementations. Though illustrated as a mobile phone, the mobile device 400 may take various forms including a wireless handset, a pager, a personal digital assistant (PDA), a gaming device, or a media player. The mobile device 400 includes a display 402 and a touch-sensitive surface and/or keys 404 for input by a user. The mobile device 400 may present options for the user to select, controls for the user to actuate, and/or cursors or other indicators for the user to direct. The mobile device 400 may further accept data entry from the user, including numbers to dial or various parameter values for configuring the operation of the handset. The mobile device 400 may further execute one or more software or firmware applications in response to user commands. These applications may configure the mobile device 400 to perform various customized functions in response to user interaction. Additionally, the mobile device 400 may be programmed and/or configured over-the-air, for example from a wireless base station, a wireless access point, or a peer mobile device 400. The mobile device 400 may execute a web browser application which enables the display 402 to show a web page. The web page may be obtained via wireless communications with a base transceiver station, a wireless network access node, a peer mobile device 400 or any other wireless communication network or system.

Figure 5:
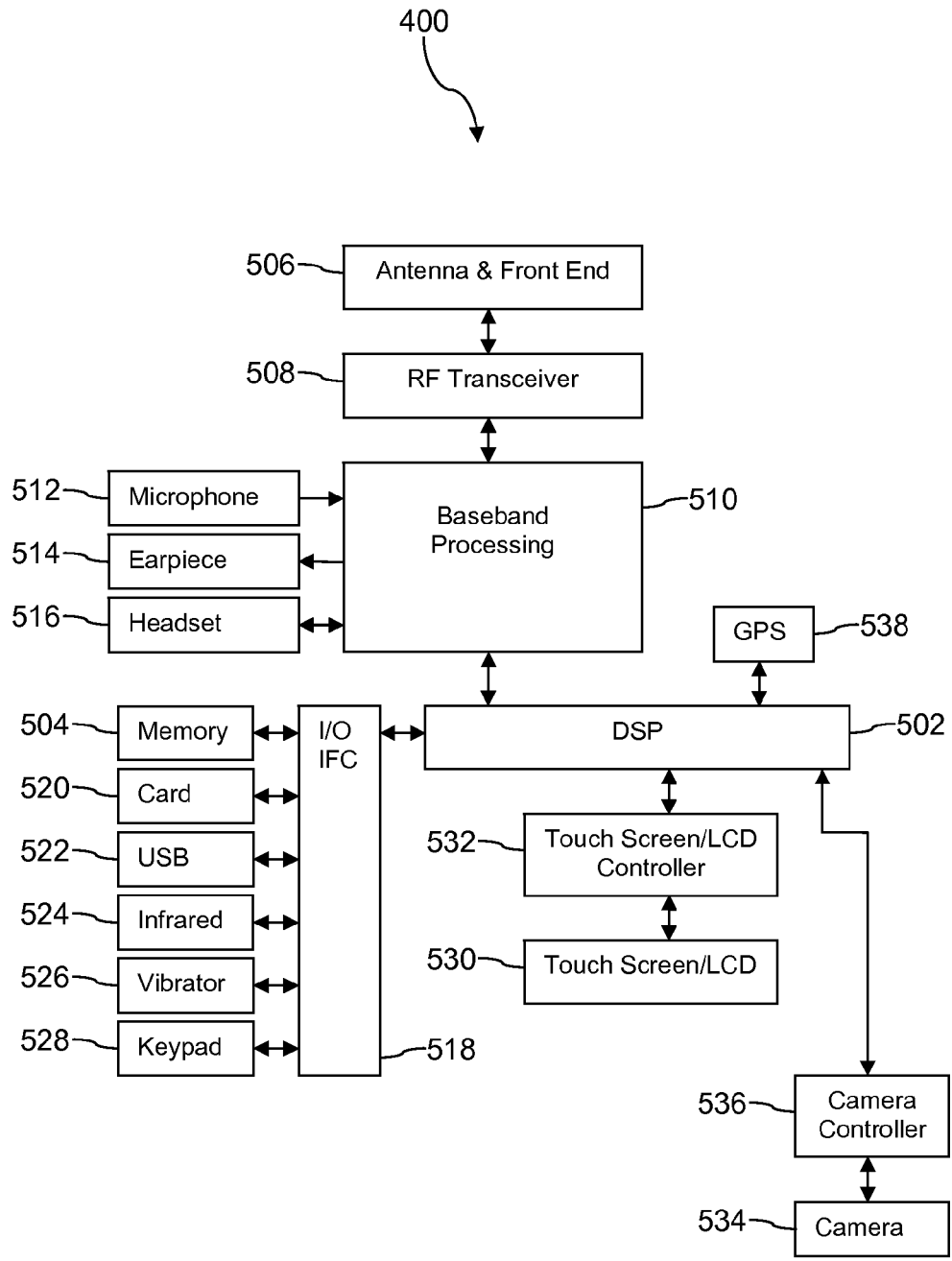
FIG. 5 is a block diagram of a mobile access terminal according to an embodiment of the disclosure.

FIG. 5 shows a block diagram of the mobile device 400. While a variety of known components of handsets are depicted, in an embodiment a subset of the listed components and/or additional components not listed may be included in the mobile device 400. The mobile device 400 includes a digital signal processor (DSP) 502 and a memory 504. As shown, the mobile device 400 may further include an antenna and front end unit 506, a radio frequency (RF) transceiver 508, a baseband processing unit 510, a microphone 512, an earpiece speaker 514, a headset port 516, an input/output interface 518, a removable memory card 520, a universal serial bus (USB) port 522, an infrared port 524, a vibrator 526, a keypad 528, a touch screen liquid crystal display (LCD) with a touch sensitive surface 530, a touch screen/LCD controller 532, a camera 534, a camera controller 536, and a global positioning system (GPS) receiver 538. In an embodiment, the mobile device 400 may include another kind of display that does not provide a touch sensitive screen. In an embodiment, the DSP 502 may communicate directly with the memory 504 without passing through the input/output interface 518. Additionally, in an embodiment, the mobile device 400 may comprise other peripheral devices that provide other functionality.

The DSP 502 or some other form of controller or central processing unit operates to control the various components of the mobile device 400 in accordance with embedded software or firmware stored in memory 504 or stored in memory contained within the DSP 502 itself. In addition to the embedded software or firmware, the DSP 502 may execute other applications stored in the memory 504 or made available via information carrier media such as portable data storage media like the removable memory card 520 or via wired or wireless network communications. The application software may comprise a compiled set of machine-readable instructions that configure the DSP 502 to provide the desired functionality, or the application software may be high-level software instructions to be processed by an interpreter or compiler to indirectly configure the DSP 502.

The DSP 502 may communicate with a wireless network via the analog baseband processing unit 510. In some embodiments, the communication may provide Internet connectivity, enabling a user to gain access to content on the Internet and to send and receive e-mail or text messages. The input/output interface 518 interconnects the DSP 502 and various memories and interfaces. The memory 504 and the removable memory card 520 may provide software and data to configure the operation of the DSP 502. Among the interfaces may be the USB port 522 and the infrared port 524. The USB port 522 may enable the mobile device 400 to function as a peripheral device to exchange information with a personal computer or other computer system. The infrared port 524 and other optional ports such as a Bluetooth® interface or an IEEE 802.11 compliant wireless interface may enable the mobile device 400 to communicate wirelessly with other nearby handsets and/or wireless base stations.

The keypad 528 couples to the DSP 502 via the interface 518 to provide one mechanism for the user to make selections, enter information, and otherwise provide input to the mobile device 400. Another input mechanism may be the touch screen LCD 530, which may also display text and/or graphics to the user. The touch screen LCD controller 532 couples the DSP 502 to the touch screen LCD 530. The GPS receiver 538 is coupled to the DSP 502 to decode global positioning system signals, thereby enabling the mobile device 400 to determine its position.

Figure 6A:
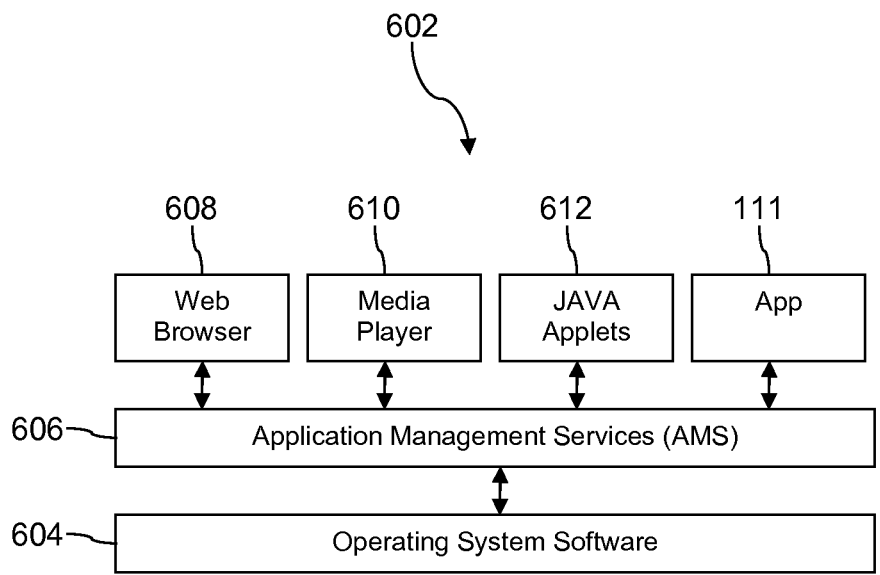
FIG. 6A is a block diagram of a software architecture according to an embodiment of the disclosure.

FIG. 6A illustrates a software environment 602 that may be implemented by the DSP 502. The DSP 502 executes operating system software 604 that provides a platform from which the rest of the software operates. The operating system software 604 may provide a variety of drivers for the handset hardware with standardized interfaces that are accessible to application software. The operating system software 604 may be coupled to and interact with application management services (AMS) 606 that transfer control between applications running on the mobile device 400. Also shown in FIG. 6A are a web browser application 608, a media player application 610, and JAVA applets 612. The web browser application 608 may be executed by the mobile device 400 to browse content and/or the Internet, for example when the mobile device 400 is coupled to a network via a wireless link. The web browser application 608 may permit a user to enter information into forms and select links to retrieve and view web pages. The media player application 610 may be executed by the mobile device 400 to play audio or audiovisual media. The JAVA applets 612 may be executed by the mobile device 400 to provide a variety of functionality including games, utilities, and other functionality.

Figure 6B:
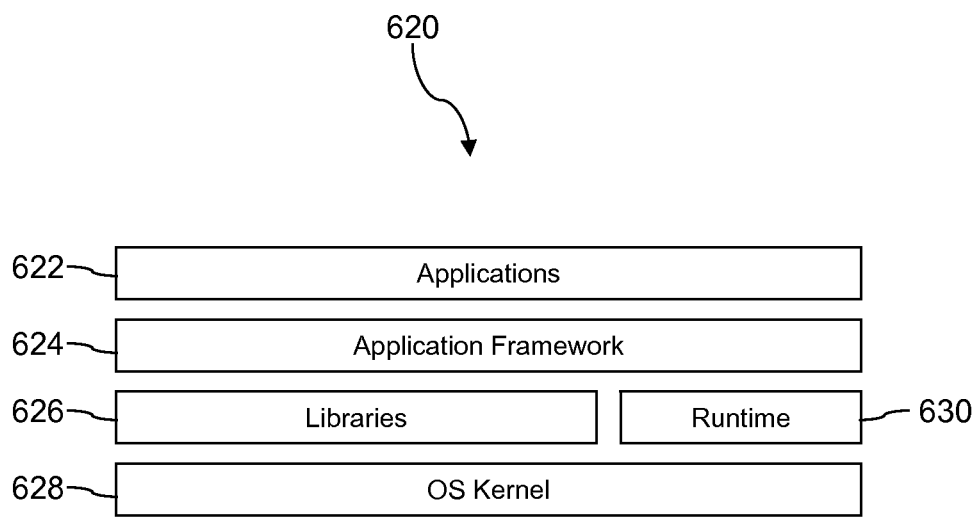
FIG. 6B is a block diagram of another software architecture according to an embodiment of the disclosure.

FIG. 6B illustrates an alternative software environment 620 that may be implemented by the DSP 502. The DSP 502 executes operating system software 628 and an execution runtime 630. The DSP 502 executes applications 622 that may execute in the execution runtime 630 and may rely upon services provided by the application framework 624. Applications 622 and the application framework 624 may rely upon functionality provided via the libraries 626.

Figure 7:
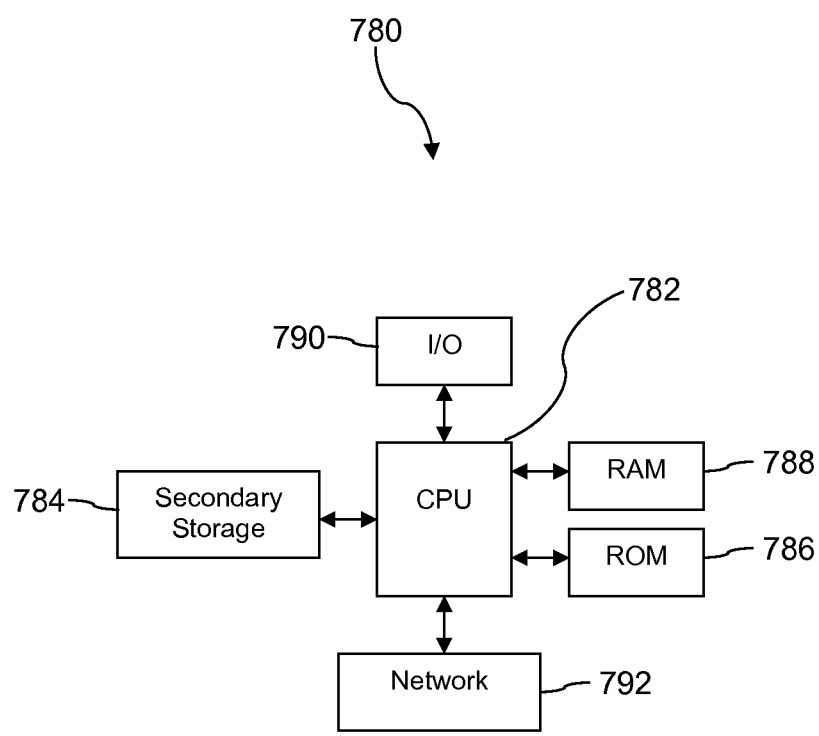
FIG. 7 is a block diagram of a computer system according to an embodiment of the disclosure.

FIG. 7 illustrates a computer system 780 suitable for implementing one or more embodiments disclosed herein. The computer system 780 includes a processor 782 (which may be referred to as a central processor unit or CPU) that is in communication with memory devices including secondary storage 784, read only memory (ROM) 786, random access memory (RAM) 788, input/output (I/O) devices 790, and network connectivity devices 792. The processor 782 may be implemented as one or more CPU chips.

It is understood that by programming and/or loading executable instructions onto the computer system 780, at least one of the CPU 782, the RAM 788, and the ROM 786 are changed, transforming the computer system 780 in part into a particular machine or apparatus having the novel functionality taught by the present disclosure. It is fundamental to the electrical engineering and software engineering arts that functionality that can be implemented by loading executable software into a computer can be converted to a hardware implementation by well known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an application specific integrated circuit (ASIC), because for large production runs the hardware implementation may be less expensive than the software implementation. Often a design may be developed and tested in a software form and later transformed, by well known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

The secondary storage 784 is typically comprised of one or more disk drives or tape drives and is used for non-volatile storage of data and as an over-flow data storage device if RAM 788 is not large enough to hold all working data. Secondary storage 784 may be used to store programs which are loaded into RAM 788 when such programs are selected for execution. The ROM 786 is used to store instructions and perhaps data which are read during program execution. ROM 786 is a non-volatile memory device which typically has a small memory capacity relative to the larger memory capacity of secondary storage 784. The RAM 788 is used to store volatile data and perhaps to store instructions. Access to both ROM 786 and RAM 788 is typically faster than to secondary storage 784. The secondary storage 784, the RAM 788, and/or the ROM 786 may be referred to in some contexts as computer readable storage media and/or non-transitory computer readable media.

I/O devices 790 may include printers, video monitors, liquid crystal displays (LCDs), touch screen displays, keyboards, keypads, switches, dials, mice, track balls, voice recognizers, card readers, paper tape readers, or other well-known input devices.

The network connectivity devices 792 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards such as code division multiple access (CDMA), global system for mobile communications (GSM), long-term evolution (LTE), worldwide interoperability for microwave access (WiMAX), and/or other air interface protocol radio transceiver cards, and other well-known network devices. These network connectivity devices 792 may enable the processor 782 to communicate with the Internet or one or more intranets. With such a network connection, it is contemplated that the processor 782 might receive information from the network, or might output information to the network in the course of performing the above-described method steps. Such information, which is often represented as a sequence of instructions to be executed using processor 782, may be received from and outputted to the network, for example, in the form of a computer data signal embodied in a carrier wave.

Such information, which may include data or instructions to be executed using processor 782 for example, may be received from and outputted to the network, for example, in the form of a computer data baseband signal or signal embodied in a carrier wave. The baseband signal or signal embedded in the carrier wave, or other types of signals currently used or hereafter developed, may be generated according to several methods well known to one skilled in the art. The baseband signal and/or signal embedded in the carrier wave may be referred to in some contexts as a transitory signal.

The processor 782 executes instructions, codes, computer programs, scripts which it accesses from hard disk, floppy disk, optical disk (these various disk based systems may all be considered secondary storage 784), ROM 786, RAM 788, or the network connectivity devices 792. While only one processor 782 is shown, multiple processors may be present. Thus, while instructions may be discussed as executed by a processor, the instructions may be executed simultaneously, serially, or otherwise executed by one or multiple processors. Instructions, codes, computer programs, scripts, and/or data that may be accessed from the secondary storage 784, for example, hard drives, floppy disks, optical disks, and/or other device, the ROM 786, and/or the RAM 788 may be referred to in some contexts as non-transitory instructions and/or non-transitory information.

In an embodiment, the computer system 780 may comprise two or more computers in communication with each other that collaborate to perform a task. For example, but not by way of limitation, an application may be partitioned in such a way as to permit concurrent and/or parallel processing of the instructions of the application. Alternatively, the data processed by the application may be partitioned in such a way as to permit concurrent and/or parallel processing of different portions of a data set by the two or more computers. In an embodiment, virtualization software may be employed by the computer system 780 to provide the functionality of a number of servers that is not directly bound to the number of computers in the computer system 780. For example, virtualization software may provide twenty virtual servers on four physical computers. In an embodiment, the functionality disclosed above may be provided by executing the application and/or applications in a cloud computing environment. Cloud computing may comprise providing computing services via a network connection using dynamically scalable computing resources. Cloud computing may be supported, at least in part, by virtualization software. A cloud computing environment may be established by an enterprise and/or may be hired on an as-needed basis from a third party provider. Some cloud computing environments may comprise cloud computing resources owned and operated by the enterprise as well as cloud computing resources hired and/or leased from a third party provider.

In an embodiment, some or all of the functionality disclosed above may be provided as a computer program product. The computer program product may comprise one or more computer readable storage medium having computer usable program code embodied therein to implement the functionality disclosed above. The computer program product may comprise data structures, executable instructions, and other computer usable program code. The computer program product may be embodied in removable computer storage media and/or non-removable computer storage media. The removable computer readable storage medium may comprise, without limitation, a paper tape, a magnetic tape, magnetic disk, an optical disk, a solid state memory chip, for example analog magnetic tape, compact disk read only memory (CD-ROM) disks, floppy disks, jump drives, digital cards, multimedia cards, and others. The computer program product may be suitable for loading, by the computer system 780, at least portions of the contents of the computer program product to the secondary storage 784, to the ROM 786, to the RAM 788, and/or to other non-volatile memory and volatile memory of the computer system 780. The processor 782 may process the executable instructions and/or data structures in part by directly accessing the computer program product, for example by reading from a CD-ROM disk inserted into a disk drive peripheral of the computer system 780. Alternatively, the processor 782 may process the executable instructions and/or data structures by remotely accessing the computer program product, for example by downloading the executable instructions and/or data structures from a remote server through the network connectivity devices 792. The computer program product may comprise instructions that promote the loading and/or copying of data, data structures, files, and/or executable instructions to the secondary storage 784, to the ROM 786, to the RAM 788, and/or to other non-volatile memory and volatile memory of the computer system 780.

In some contexts, the secondary storage 784, the ROM 786, and the RAM 788 may be referred to as a non-transitory computer readable medium or a computer readable storage media. A dynamic RAM embodiment of the RAM 788, likewise, may be referred to as a non-transitory computer readable medium in that while the dynamic RAM receives electrical power and is operated in accordance with its design, for example during a period of time during which the computer 780 is turned on and operational, the dynamic RAM stores information that is written to it. Similarly, the processor 782 may comprise an internal RAM, an internal ROM, a cache memory, and/or other internal non-transitory storage blocks, sections, or components that may be referred to in some contexts as non-transitory computer readable media or computer readable storage media.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A mobile phone, comprising:
   a peripheral device of the mobile phone;
   a cellular radio transceiver of the mobile phone;
   a processor of the mobile phone;
   a non-transitory memory of the mobile phone; and
   an application stored in the non-transitory memory of the mobile phone that, when executed by the processor of the mobile phone:
   receives an indicia of each of a plurality of products provided by a from the peripheral device of the mobile phone,
   identifies the products based on each received indicia,
   retrieves, from the non-transitory memory of the mobile phone, a plurality of payment rules, wherein a first payment rule of the plurality of payment rules provides that a first category of product items are to be paid from a first payment account of a plurality of payment accounts and a second payment rule of the plurality of payment rules provides that a second category of product items are to be paid from a second payment account of the plurality of payment accounts,
   analyzes, on the mobile phone, the plurality of payment rules including the first and second payment rules that are associated with making an electronic payment for the identified products, wherein the analysis of the first payment rule identifies a first subset of the identified products as associated with the first category of product items and the analysis of the second payment rule identifies a second subset of the identified products as associated with the second category of product items,
   based on the analysis of the plurality of payment rules including the first and second payment rules, identifies the first payment account for paying for the first subset of the identified products and the second payment account for paying for the second subset of the identified products,
   in response to identifying the first and second payment accounts, presents, on a display, the identification of the first payment account with the first subset of identified products and the identification of the second payment account with the second subset of identified products for making an electronic payment for at least some of the identified products, and
   transmits, by the mobile phone, a first payment transaction message that identifies the first payment account corresponding with the first subset of the identified products and a second payment transaction message that identifies the second payment account corresponding with the second subset of the identified products as an electronic payment for the at least some of the identified products.

2. The mobile phone of claim 1, wherein the application, when executed by the processor, further presents, on the mobile phone, a notification that displays a product discount based on at least one of the received indicia.

3. The mobile phone of claim 1, further comprising a near field communication (NFC) transceiver, wherein at least one of the first payment message or second payment message is transmitted by the mobile phone using the cellular radio transceiver, the NFC transceiver, or both.

4. The mobile phone of claim 1, wherein the peripheral device comprises a digital camera that is configured to capture an image of the indicia that includes a bar code.

5. The mobile phone of claim 1, wherein the peripheral device is a near field communication (NFC) transceiver configured to read the indicia from a radio frequency identity (RFID) chip coupled to one of the products.

6. The mobile phone of claim 1, wherein at least one of the plurality of payment rules is user defined.

7. The mobile phone of claim 1, wherein the processor comprises a trusted security zone, and wherein the application executes in the trusted security zone.

8. A method of completing a payment transaction, comprising:
scanning, by a mobile phone, each indicia of a plurality of products;
identifying the products based on each scanned indicia;
retrieving, from a non-transitory memory of the mobile phone, a plurality of payment rules, wherein a first payment rule of the plurality of payment rules provides that a first category of product items are to be paid from a first payment account of a plurality of payment accounts and a second payment rule of the plurality of payment rules provides that a second category of product items are to be paid from a second payment account of the plurality of payment accounts;
analyzing, by the mobile phone, the plurality of payment rules including the first and second payment rules that are associated with making an electronic payment for the identified products, wherein the analysis of the first payment rule identifies a first subset of the identified products as associated with the first category of product items and the analysis of the second payment rule identifies a second subset of the identified products as associated with the second category of product items;
based on analyzing the plurality of payment rules including the first and second payment rules, identifying the first payment account for paying for the first subset of the identified products and the second payment account for paying for the second subset of the identified products; and
subsequent to identifying the first and second payment accounts, transmitting, by the mobile phone, a first payment transaction message that identifies the first payment account corresponding with the first subset of the identified products and a second payment transaction message that identifies the second payment account corresponding with the second subset of the identified products to electronically pay for at least some of the identified products.

9. The method of claim 8, wherein scanning each indicia comprises capturing, by a camera of the mobile phone, an image of the indicia that includes a bar code, and analyzing the bar code based on the captured image.

10. The method of claim 8, wherein scanning each indicia comprises receiving a radio frequency identity (RFID) transmission from one of the plurality of products, and analyzing the received RFID transmission.

11. The method of claim 8, wherein analyzing the plurality of payment rules comprises analysis of at least one payment rule that is a user-defined payment rule.

12. The method of claim 8, wherein analyzing the plurality of payment rules comprises incorporating consideration of pricing discounts of at least one of the identified products and related products.

13. The method of claim 12, further comprising presenting, on a display of the mobile phone, a notification associated with a pricing discount of at least one of the identified products and related products.

14. A method of completing a payment transaction, comprising:
scanning, by a mobile phone, indicia of a plurality of products;
accumulating, by the mobile phone, information about the plurality of scanned products in a trusted security zone of the mobile phone, wherein accumulating information comprises identifying products based on the scanned indicia of the products;
retrieving, from a non-transitory memory of the mobile phone, a plurality of payment rules, wherein a first payment rule of the plurality of payment rules provides that a first category of product items are to be paid from a first payment account of a plurality of payment accounts and a second payment rule of the plurality of payment rules provides that a second category of product items are to be paid from a second payment account of the plurality of payment accounts;
analyzing, by the mobile phone, the plurality of payment rules including the first and second payment rules that are associated with making an electronic payment for the identified products, wherein the analysis of the first payment rule identifies a first subset of the identified products as associated with the first category of product items and the analysis of the second payment rule identifies a second subset of the identified products as associated with the second category of product items;
based on analyzing the plurality of payment rules including the first and second payment rules, identifying the first payment account for paying for the first subset of the identified products and the second payment account for paying for the second subset of the identified products;
subsequent to identifying the first and second payment accounts, transmitting, via a trusted communication infrastructure of the mobile phone, a first payment transaction message that identifies the first payment account corresponding with the first subset of the identified products and a second payment transaction message that identifies the second payment account corresponding with the second subset of the identified products to electronically pay for at least some of the identified products to a trusted security zone of a server computer; and
presenting, on a display of the mobile phone, a notification confirming that an enterprise in which the plurality of products are being sold has received payment for the at least some of the identified products corresponding to the first and second payment transaction messages transmitted by the mobile phone.

15. The method of claim 14, wherein the trusted security zone of the mobile phone stores an authentication token, wherein the authentication token is transmitted to the trusted security zone of the server computer.

16. The method of claim 14, wherein the trusted communication infrastructure of the mobile phone uses a cellular wireless communication link.

17. The method of claim 16, wherein the cellular wireless communication link is established according to one of a code division multiple access (CDMA) protocol, a global system for mobile communications (GSM) protocol, a long-term evolution (LTE) protocol, or a worldwide interoperability for microwave access (WiMAX) protocol.

18. The method of claim 14, wherein transmitting the first and second payment transaction messages occurs subsequent to presenting, on the display of the mobile phone, a discount accepted by the enterprise.

19. The method of claim 14, wherein at least one of the plurality of payment rules is user-defined.

20. The method of claim 14, further comprising displaying, on the display of the mobile phone, a discount based on at least one of the scanned indicia or the accumulated information.

* * * * *